US007987178B2

(12) United States Patent
Hueske et al.

(10) Patent No.: US 7,987,178 B2
(45) Date of Patent: Jul. 26, 2011

(54) AUTOMATICALLY DETERMINING OPTIMIZATION FREQUENCIES OF QUERIES WITH PARAMETER MARKERS

(75) Inventors: Fabian Hueske, Ulm (DE); Volker Gerhard Markl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 12/125,146

(22) Filed: May 22, 2008

(65) Prior Publication Data
US 2008/0222092 A1     Sep. 11, 2008

Related U.S. Application Data

(63) Continuation of application No. 11/673,142, filed on Feb. 9, 2007, now abandoned.

(51) Int. Cl.
*G06F 17/30* (2006.01)
(52) U.S. Cl. .................. 707/713; 707/718; 707/719
(58) Field of Classification Search .................. 707/609, 707/687–689, 705, 713–721; 717/101, 127
See application file for complete search history.

(56) References Cited

U.S. PATENT DOCUMENTS

| 5,412,804 | A | * | 5/1995 | Krishna .................... 1/1 |
| 5,544,355 | A | | 8/1996 | Chaudhuri et al. |
| 5,819,255 | A | * | 10/1998 | Celis et al. ................ 1/1 |
| 5,822,747 | A | * | 10/1998 | Graefe et al. .............. 1/1 |
| 6,021,405 | A | | 2/2000 | Celis et al. |
| 6,061,676 | A | * | 5/2000 | Srivastava et al. ......... 707/694 |
| 6,205,441 | B1 | * | 3/2001 | Al-omari et al. ........... 1/1 |
| 6,219,660 | B1 | | 4/2001 | Haderle et al. |
| 6,330,552 | B1 | | 12/2001 | Farrar et al. |
| 6,351,742 | B1 | | 2/2002 | Agarwal et al. |
| 6,353,818 | B1 | * | 3/2002 | Carino, Jr. ................. 1/1 |
| 6,356,891 | B1 | | 3/2002 | Agrawal et al. |
| 6,510,428 | B2 | | 1/2003 | Tsuchida et al. |

(Continued)

FOREIGN PATENT DOCUMENTS

WO      W00055755      9/2000

(Continued)

OTHER PUBLICATIONS

Florian Waas1; et al. "Counting, Enumerating, and Sampling of Execution Plans in a Cost-Based Query Optimizer",ACM 2000, pp. 499-509.*

(Continued)

*Primary Examiner* — Srirama Channavajjala
(74) *Attorney, Agent, or Firm* — Schmeiser, Olsen & Watts

(57) ABSTRACT

A method and system for automatically determining optimization frequencies of queries having one or more parameter markers. Execution plans for a query are generated and each plan is associated with one or more bind value sets. An optimization frequency is selected based on differences between pairs of execution costs where one execution cost of a pair is a cost of executing the query with a bind value set via a first execution plan and the other execution cost of the pair is a cost of optimally executing the query with the bind value set via a second execution plan. The differences are based on maximum selectivity or cardinality distances associated with the bind value sets. If none of the differences exceeds a predefined value, the query is optimized once. If at least one of the differences exceeds the predefined value, the query is reoptimized each time the query is executed.

17 Claims, 12 Drawing Sheets

U.S. PATENT DOCUMENTS

| | | | |
|---|---|---|---|
| 6,529,901 B1* | 3/2003 | Chaudhuri et al. | 1/1 |
| 6,735,594 B1 | 5/2004 | Zimowski et al. | |
| 6,757,670 B1 | 6/2004 | Inohara et al. | |
| 6,865,567 B1* | 3/2005 | Oommen et al. | 1/1 |
| 6,928,451 B2 | 8/2005 | Mogi et al. | |
| 6,957,211 B1 | 10/2005 | Tyulenev et al. | |
| 7,051,034 B1* | 5/2006 | Ghosh et al. | 707/718 |
| 7,299,226 B2* | 11/2007 | Bruno et al. | 707/714 |
| 2005/0065921 A1 | 3/2005 | Hrle et al. | |
| 2005/0071346 A1 | 3/2005 | Bernal et al. | |
| 2005/0097078 A1 | 5/2005 | Lohman et al. | |
| 2005/0192951 A1 | 9/2005 | Day et al. | |
| 2005/0223019 A1* | 10/2005 | Das et al. | 707/102 |
| 2005/0267866 A1 | 12/2005 | Markl et al. | |
| 2006/0074875 A1 | 4/2006 | Faunce et al. | |
| 2006/0136396 A1* | 6/2006 | Brobst | 707/3 |
| 2006/0212429 A1* | 9/2006 | Bruno et al. | 707/3 |
| 2007/0179947 A1* | 8/2007 | Ahmed et al. | 707/5 |
| 2007/0192296 A1* | 8/2007 | Burger et al. | 707/3 |
| 2008/0052266 A1* | 2/2008 | Goldstein et al. | 707/2 |
| 2008/0109424 A1* | 5/2008 | Day et al. | 707/5 |
| 2008/0195577 A1 | 8/2008 | Fan et al. | |
| 2008/0215531 A1 | 9/2008 | Markl et al. | |
| 2008/0222092 A1 | 9/2008 | Hueske et al. | |
| 2008/0222093 A1 | 9/2008 | Fan et al. | |
| 2008/0228831 A1 | 9/2008 | Aboulnaga et al. | |

FOREIGN PATENT DOCUMENTS

| | | |
|---|---|---|
| WO | WO2005069163 | 7/2005 |

OTHER PUBLICATIONS

Yannis E. Ioannidis, "Query Optimization", pp. 1-38.*

Yousuke Watanabe et al. "Adaptive Query Optimization Method for Multiple Continuous Queries",Proceedings of the 21st International Conference on Data Engineering (ICDE '05), pp. 1-4.*

Kil Hong Joo et al. "An efficient query evaluation in a mediator based on implementation plan",Information Sciences 176 (2006) 799-819.*

Wei Hong et al. "Optimization of Parallel Query Execution Plans in XPRS", 1991 EBB, pp. 218-225.*

Faruk Polat et al. "Semantic information based-alternative plan generation for multiple query optimization",Informatin Sciences 137 (2001) 103-133.*

Cole et al., "Optimization of Dynamic Query Evaluation Plans"; Dec. 1993; pp. 1-23.

Ganguly, Sumit; "Design and Analysis of Parametric Query Optimization Algorithms"; Proceedings of the 24th VLDB Conference New York, USA, 1998; pp. 228-238.

Markl, Volker et al.; "Robust Query Processing through Progressive Optimization"; SIGMOD 2004, Jun. 13-18, 2004, Paris, Framce; 12 pages.

Navin Kabra et al.; "Efficient Mid-Query Re-Optimization of Sub-Optimal Query Execution Plans"; 1998 ACM; pp. 106-117.

Tanu Malik et al; A Black-Box Approach to Query Cardinality Estimation; 3rd Biennial Conference on Innovative Data Systems Research (CIDR) Jan. 7-10, 2007, Asilomar, California, USA; pp. 56-67.

Walid G. Aref et al; Optimization Strategies for Spatial Query Processing*; Proceedings of the 17th International conference on Very Large Data Bases; Barcelona, Sep. 1991; pp. 81-90.

Zaiqing Nie & Subbarao Kambhampati; Joint Optimization of Cost and Coverage of Query Plans in Data Integration; appeared in Proc. CIKM 2001; pp. 223-230.

Notice of Allowance for U.S. Appl. No. 11/673,142, filing Date Feb. 9, 2007; Confirmation No. 2106.

Gunning Technology Solutions, LLC; We help companies succeed with DB2, ORACLE, SQL Server, and MySQL; http://www.gunningts.com/db2zone.htm; 16 pages.

Hulgeri, et al.; AniPQO: Almost Non-intrusive Parametric Query Optimization for Nonlinear Cost Functions; Proceedings of the 29th VLDB Conference, Berlin, Germany, 2003; 12 pages.

Dietterich, et al.; Solving Multiclass Learning Problems via Error-Correcting Output Codes; Journal of Artificial Intelligence Research 2 (1995); Submitted Aug. 1994; published Jan. 1995; pp. 263-286.

Ioannidis, et al.; Parametric Query Optimization; In Proceedings of the 18th International Conference on Very Large Data Bases, Vancouver, Aug. 1992; 24 pages.

* cited by examiner

320

```
== BEGIN DUMP
SECTION UNIQUE ID:20050728215409859991000000

Elapsed time for query is: 1 sec 138345977 ns

== SQL statement length: 55
== SQL statement text is:
   SELECT id FROM car WHERE (car.year > ? AND car.id > ? )

== PARAMETER MARKER SECTION:

Number of param markers is: 2
Parameter Marker number:1
        type= 1,integer  len=   4 ptr=1101730c0:? ind=0 cp=0
        data in hex(length=4):000007C6
Parameter Marker number:2
        type= 1,integer  len=   4 ptr=1101730a8:? ind=0 cp=0
        data in hex(length=4):0000CA16

== OPTIMIZER'S ESTIMATES SECTION:

lolepop#,    name         estimate,    actual,       from op#
   2         FETCH            98          0             12
   3         IOA             475          1              7
   3         IOA             475          1              6
   5         ISCAN           475          0              3

== RUNTIME COUNTERS SECTION:

lolepop#,    opcode,    actual1,      actual2,        op#
  65535      BNI           1              0             1
      5      SR2       19877          19877             2
      5      EXP           0              0             3
      5      MOVZ          1              0             4
      5      TAsp          1              0             5
      4      SRT           1              0             6
      3      RLF           1              0             7
      2      ltLINT    15233          10237             8
      2      JF            0              0             9
      2      ltLINT    15233              0            10
      2      BNO2      10237              0            11
      2      EXP           0              0            12
      1      BNO           1              0            13
  65535      EXT           1              0            14
== END DUMP for SECTION WITH UNIQUE ID: 20050728215409859991000000
:
```

```
CREATE TABLE PMQUERIES (
        QID INTEGER NOT NULL,
        QTEXT VARCHAR(2000) NOT NULL,
        DBNAME VARCHAR(256) NOT NULL,
        QCOUNT INTEGER NOT NULL,
        PRIMARY KEY(QID)
        );

CREATE TABLE PMVALUES (
        QID INTEGER NOT NULL,
        PNO INTEGER NOT NULL,
        PVID INTEGER NOT NULL,
        PVAL VARCHAR(2000) NOT NULL,
        PVCOUNT INTEGER NOT NULL,
        FOREIGN KEY(QID)
                REFERENCES PMQUERIES (QID)
                ON DELETE CASCADE,
        PRIMARY KEY(PVID)
        );

CREATE TABLE PMCOMBINATIONS (
        QID INTEGER NOT NULL,
        CID INTEGER NOT NULL,
        PVID INTEGER NOT NULL,
        CCOUNT INTEGER NOT NULL,
        FOREIGN KEY (QID)
                REFERENCES PMQUERIES (QID)
                ON DELETE CASCADE,
        FOREIGN KEY (PVID)
                REFERENCES PMVALUES (PVID),
        PRIMARY KEY(CID,PVID)
        );

CREATE TABLE PMEXECUTIONS (
        QID INTEGER NOT NULL,
        EXECUTED TIMESTAMP NOT NULL,
        CID INTEGER NOT NULL,
        EXEC_TIME TIMESTAMP NOT NULL,
        FOREIGN KEY (QID)
                REFERENCES PMQUERIES (QID)
                ON DELETE CASCADE,
        PRIMARY KEY(EXECUTED, CID)
        );
```

| QUERY TEXT | SELECT id FROM car WHERE (car . YEAR > ? AND car . id > ?) | |
|---|---|---|
| DATABASE NAME | CARTEST | |
| BIND VALUE SETS | VALUE # 1 | VALUE # 2 |
| | 1998 | 63817 |
| | 2000 | 12494 |
| | 1962 | 32151 |
| | ... | ... |

SELECT id FROM car WHERE (car . year > 1998 AND car . id > 63817)

EXPLAIN ALL SET QUERYTAG = '112322237016838'
SET QUERYID = 1 FOR SELECT id FROM car WHERE
(car . year > 1998 AND car . id > 63817 )

FIG. 4D

AUTOMATICALLY DETERMINING OPTIMIZATION FREQUENCIES OF QUERIES WITH PARAMETER MARKERS

This application is a continuation application claiming priority to Ser. No. 11/673,142, filed Feb. 9, 2007, now abandoned.

FIELD OF THE INVENTION

The present invention relates to a method and system for automatically determining optimization frequencies of queries with parameter markers.

BACKGROUND OF THE INVENTION

Conventionally, a programmer or a database administrator (DBA) managing a database system manually selects a reoptimization mode for queries having parameter markers. This selection of an optimal reoptimization mode depends not only on the query itself, but also on the bind values of the query's parameter marker(s). As these bind values can be unknown or change over time, an attempt to select an optimal reoptimization mode is a non-trivial procedure that may result in selecting a sub-optimal reoptimization mode. This burdensome manual process of selecting a reoptimization mode decreases the productivity of the programmer or DBA and increases the total cost of ownership of the database system. Further, a selection of a sub-optimal reoptimization mode slows down a program or the entire database system. Thus, there exists a need to overcome at least one of the preceding deficiencies and limitations of the related art.

SUMMARY OF THE INVENTION

In first embodiments, the present invention provides a computer-implemented method of automatically determining an optimization frequency of a query having one or more parameter markers, the method comprising:

generating, by a computing system, a plurality of query execution plans for an execution of a query having one or more parameter markers, each query execution plan associated with one or more bind value sets of a plurality of bind values sets;

determining that no difference of a plurality of differences between pairs of execution costs exceeds a predefined threshold value or that at least one difference of the plurality of differences exceeds the predefined threshold value, each pair of execution costs including a first execution cost and a second execution cost, the first execution cost being a cost of executing the query with a bind value set of the plurality of bind value sets via a first query execution plan of the plurality of query execution plans and the second execution cost being a cost of optimally executing the query with the bind value set via a second query execution plan of the plurality of query execution plans;

automatically selecting an optimization frequency by the computing system; and storing the optimization frequency in a computer-usable medium, wherein the optimization frequency is optimizing the query once as a result of a first determination by the determining that no difference of the plurality of differences exceeds the predefined threshold value, and wherein the optimization frequency is reoptimizing the query each time the query is executed as a result of a second determination by the determining that at least one difference of the plurality of differences exceeds the predefined threshold value.

In second embodiments, the present invention provides a computer-implemented method of determining an optimization frequency of a query having one or more parameter markers, the method comprising:

obtaining, by a computing system, a plurality of bind value sets, each bind value set including one or more bind values and associated with one or more parameter markers of a query;

obtaining, by the computing system, a plurality of measurement sets associated with the bind value sets in a one-to-one correspondence, each measurement set selected from the group consisting of one or more selectivity measurements and one or more cardinality measurements;

determining, by the computing system, a plurality of query execution plans, each query execution plan capable of optimally executing the query with one or more bind value sets of the plurality of bind value sets;

determining, by the computing system, a first set of execution costs associated with the query execution plans of the plurality of query execution plans in a one-to-one correspondence, each execution cost of the first set being a cost of optimally executing the query with a bind value set of the plurality of bind value sets;

determining, by the computing system, one or more pairs of bind value sets $(p1, \ldots, pn)_i$, $(q1, \ldots, qn)_i$ of the plurality of bind value sets, the determining the one or more pairs of bind value sets including determining one or more distances $d_i$ between a first measurement set $S1_i$ associated with the bind value set $(p1, \ldots, pn)_i$ and a second measurement set $S2_i$ associated with the $(q1, \ldots, qn)_i$, the $S1_i$ and the $S2_i$ included in the plurality of measurement sets, wherein each distance $d_i$ is a maximum distance between any pair of measurement sets associated with query execution plans $P_i$ and $Q_i$ of the plurality of query execution plans, wherein the query execution plan $P_i$ is an optimal query execution plan associated with the bind value set $(p1, \ldots, pn)_i$ and the query execution plan $Q_i$ is an optimal query execution plan associated with the bind value set $(p1, \ldots, pn)_i$, and wherein the $i \geq 1$;

determining, by the computing system, one or more pairs of execution costs $C1_i$, $C2_i$ of a second set of execution costs, wherein the $C1_i$ is a cost of executing the query via the query execution plan $P_i$ with bind value set $(q1, \ldots, qn)_i$ and the $C2_i$ is a cost of executing the query via the query execution plan $Q_i$ with bind value set $(p1, \ldots, pn)_i$;

determining, by the computing system, one or more pairs of differences $D1_i$ and $D2_i$, wherein the $D1_i$ is a difference between the cost $C1_i$ and an optimal execution cost $OC1_i$ of the first set of execution costs and the $D2_i$ is a difference between the cost $C2_i$ and an optimal execution cost $OC2_i$ of the first set of execution costs, wherein the $OC1_i$ is a cost of optimally executing the query via the query execution plan $Q_i$ with bind value set $(q1, \ldots, qn)_i$, and the $OC2_i$ is a cost of optimally executing the query via the query execution plan $P_i$ with bind value set $(p1, \ldots, pn)_i$;

automatically selecting, by the computing system, an optimization frequency, wherein the optimization frequency is selected from the group consisting of optimizing the query once and reoptimizing the query each time the query is executed; and storing the optimization frequency in a computer-usable medium, wherein the optimization frequency is the optimizing the query once as a result of a first determination, via the determining the one or more pairs of differences, that no difference of the one or more pairs of differences exceeds a predefined threshold value, and wherein the optimization frequency is the reoptimizing the query each time the query is executed as a result of a second determination, via the determining the one or more pairs of differences, that at least one difference of the one or more pairs of differences exceeds the predefined threshold value.

Systems and computer program products corresponding to the above-summarized methods are also described herein.

Advantageously, the present invention provides a technique for using selectivity or cardinality information to automatically determine the reoptimization mode of a query having parameter markers, thereby improving the productivity of DBAs and reducing the total cost of ownership of databases.

BRIEF DESCRIPTION OF THE DRAWINGS

FIG. 3B is an example of a binary dump file converted into a human readable format from which query information and bind values are extracted in the process of FIG. 3A, in accordance with embodiments of the present invention.

FIG. 3C are examples of code for creating database tables that store the query information and bind values in the process of FIG. 3A, in accordance with embodiments of the present invention.

FIG. 4B is an example of a table from which query information and bind value sets are requested and obtained in the process of FIG. 4A, in accordance with embodiments of the present invention.

FIG. 4C is an example of a query in which parameter markers are replaced by bind values, where the query's text is obtained from the table in FIG. 4B, in accordance with embodiments of the present invention.

FIG. 4D is an example of an Explain query generated from the query in FIG. 4C, in accordance with embodiments of the present invention.

DETAILED DESCRIPTION OF THE INVENTION

Figure 1:
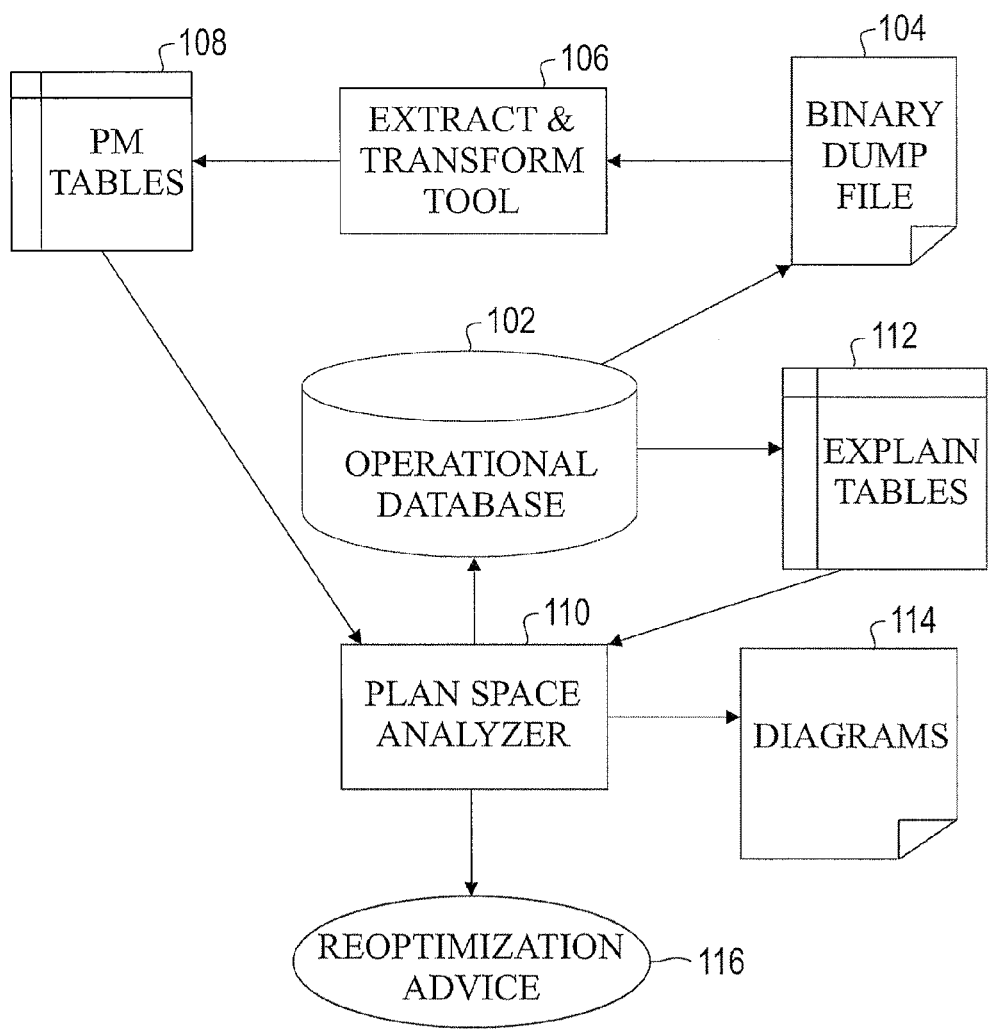
FIG. 1 is a block diagram of a system for automatically determining optimization frequencies of queries with parameter markers, in accordance with embodiments of the present invention.

The present invention provides a technique for using selectivity information to automatically determine an optimization frequency (a.k.a. reoptimization mode) of a query having one or more parameter markers. The selectivity information is obtained for multiple instances of parameter marker values either through query feedback, the system catalog, or by drawing random samples. The present invention determines whether a query execution plan is sensitive to the selectivity of the parameter marker values. To support this determination of the query execution plan's sensitivity, the technique disclosed herein creates a graph of the selectivity space and associates each parameter marker bind value set in this space with a query execution plan. By taking the largest distances in the selectivity space, the technique disclosed herein determines whether one query execution plan is sufficient to cover the selectivity space, or whether multiple query execution plans are required. Further, the technique provides a recommendation to either optimize the query once or to reoptimize the query for every set of parameter marker bind values.

Definitions

Parameter marker: a placeholder for a variable within a query. To provide parameter markers with values, variables are bound to the parameter markers. A bind value replaces a parameter marker at query execution time. A bind value of a parameter marker is known only at query execution time.

Plan space diagram: a diagram that shows the location of all different query execution plans for a query having two parameter markers in the space defined by the selectivities of the bind values of the parameter markers.

Frequency diagram: a bar chart showing the frequency distribution of the selectivities of the bind values of a parameter marker (e.g., one axis of the chart plots selectivity and the other axis plots frequency in percent).

Selectivity: A ratio or percentage of data sets that are sorted out by a predicate of a database query. For example, a predicate is a condition in a WHERE clause applied to a database table and a selectivity indicates the percentage of rows of the table that satisfy the condition.

Default selectivity: A default selectivity assumes a uniform data distribution in an affected database column and is defined as:

$$s = \frac{1}{\text{(number of distinct values of the affected column)}}$$

Reoptimization mode: Defines when and how often a database optimizer is called to select a query execution plan for a query with one or more parameter markers. Reoptimization modes are also referred to as optimization frequencies and include ReOpt None, ReOpt Once and ReOpt Always.

ReOpt None: A reoptimization mode in which queries are optimized once before their first execution during a query preparation process. Since parameter marker bind values are unknown at optimization time and known only at query execution time, the optimizer cannot estimate their selectivities using statistical information. Instead, the optimizer determines a default selectivity for each parameter marker predicate. Using the default selectivities, the optimizer selects a query execution plan that is cached and used for all executions of the query. ReOpt None results in an optimal query execution plan only if the data is uniformly distributed in all affected database columns. DB2® uses ReOpt None as the default reoptimization mode.

ReOpt Once: A reoptimization mode in which a query is optimized only once, before the query's first execution and using the query's first bind value set to estimate the selectivities of the parameter marker predicates. The optimizer chooses a query execution plan based on execution cost estimations for the estimated selectivities. The resulting query execution plan is cached and used for all executions of the query. ReOpt Once provides a savings in optimization costs, but causes high execution costs if the cached query execution plan is suboptimal for a set of bind values. ReOpt Once is efficient only if the selectivities of the parameter marker predicates for all subsequent bind value sets do not differ significantly from the aforementioned selectivities determined for the first bind value set.

ReOpt Always: A reoptimization mode in which a query is reoptimized before every execution of the query, each time using a current bind value set (i.e., one or more bind values associated with the current query execution) to estimate current selectivities of the parameter marker predicates. For each reoptimization, the optimizer selects the query execution plan that is optimal for the current bind value set based on the optimizer's knowledge of the data distribution according to available database statistics. ReOpt Always is expensive in terms of optimization costs.

System Overview

FIG. 1 is a block diagram of a system for automatically determining optimization frequencies of queries with parameter markers, in accordance with embodiments of the present invention. System 100 includes an operational database 102, a binary dump file 104, and extract & transform software tool 106 and parameter marker (PM) tables 108. Operational database 102 dumps query execution information in binary dump file 104. The query execution information is associated with a query that has one or more parameter markers. Extract & transform tool 106 extracts query text, parameter marker values and query execution time information from binary dump file 104. The extracted data is stored in tables 108.

In another embodiment, the query text, parameter marker values and query execution time information are collected from a source other than binary dump file 104 and are stored in a structure (e.g., plain files) other than PM tables 108.

System 100 also includes a software-based query execution plan space analyzer 110, database explain tables 112, optional frequency and plan space diagrams 114 and reoptimization advice 116. Hereinafter, a query execution plan space analyzer is also referred to simply as a plan space analyzer. Plan space analyzer 110 combines parameter marker data from tables 108 with explain information from explain tables 112, optionally generates frequency and/or plan space diagrams, and determines a recommendation 116 for a reoptimization mode (i.e., an optimization frequency). The recommended reoptimization mode is stored in a computer-usable or computer-readable medium (not shown), transmitted to a user (not shown) of system 100 or displayed onscreen or in a hard copy format. The process for determining a recommended reoptimization mode is described below relative to FIGS. 2, 3A and 4A.

Overview of Determining Optimization Frequency

Figure 2:
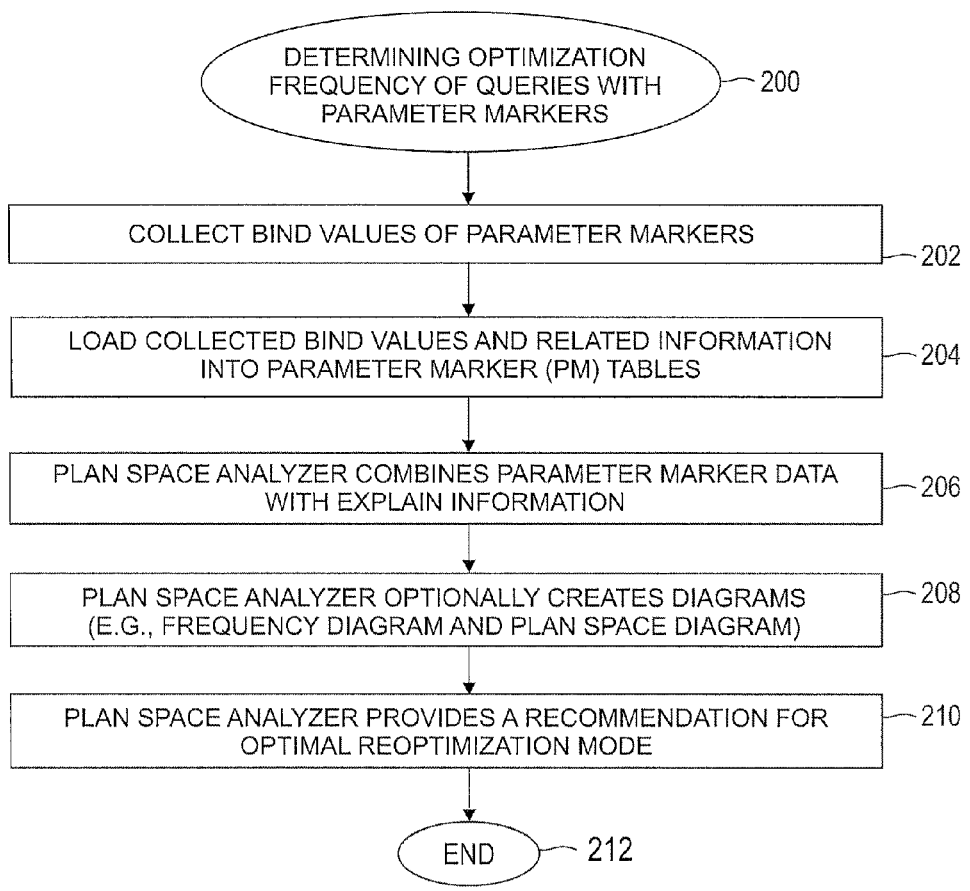
FIG. 2 is a flow diagram of a process of automatically determining optimization frequencies of queries with parameter markers in the system of FIG. 1, in accordance with embodiments of the present invention.

FIG. 2 is a flow diagram of a process of automatically determining optimization frequencies of queries with parameter markers in the system of FIG. 1, in accordance with embodiments of the present invention. The optimization frequency determination process of FIG. 2 begins at step 200. In step 202, a software tool (e.g., extract & transform tool 106 in FIG. 1) collects bind values of each parameter marker of a set of one or more parameter markers included in a query. In a first embodiment, the bind values are written into binary dump file 104 (see FIG. 1) (e.g., a RDSMon dump file provided by a DB2® feedback warehouse architecture) and the bind values are subsequently extracted from the binary dump file in step 202 by extract & transform tool 106 (see FIG. 1).

In a second embodiment, a software tool (not shown) that replaces extract & transform tool 106 in FIG. 1 uses single column statistics (e.g., information about frequent values and quantiles of a table's column) from system catalog tables to collect the bind values in step 202. Using single column database statistics in step 202 advantageously allows bind values to be collected according to their selectivities, thereby permitting the bind values to be used to analyze the whole query execution plan space, as described below relative to FIG. 4A. Hereinafter, a query execution plan space is also referred to simply as a plan space. Further, using database statistics in step 202 makes it possible to collect bind values for queries that never executed. On the other hand, using single column statistics in step 202 requires up-to-date statistics and refreshing such statistics is expensive. Further, collecting bind values from single column statistics assumes independence of the columns to which the parameter markers refer. To request values from single column statistics, it is necessary to identify the tables and columns to which the parameter marker predicates of a query refer. Therefore, a complex task of parsing of the query must be performed.

In a third embodiment, a software tool (not shown) that replaces extract & transform tool 106 in FIG. 1 randomly selects bind value sets in step 202. The bind value sets are selected from the tables and columns to which the parameter marker predicates of a query refer. Random selection of bind value sets in step 202 advantageously allows bind values for any query to be selected irrespective of whether the query ever executed. The number of collected bind values may be assigned as the values are randomly selected from the whole range of data. Further, using random sampling to collect bind values in step 202 allows whole bind value sets to be collected and not single bind values. Therefore, independence of the columns to which the parameter markers refer does not have to be assumed. However, it is very expensive to collect bind values by random sampling if the query joins large tables because the whole data range has to be scanned to ensure a satisfactory distribution of bind values. Furthermore, the query must be parsed if sampling is used in step 202.

In one embodiment, extract & transform tool 106 (see FIG. 1) transforms the data extracted in step 202 into strings to facilitate handling and storage. In one embodiment, after the extraction in step 202, a validity check is performed on the extracted data. This validity check includes a check that the query includes one or more parameter markers. If the validity check determines that a query includes at least one parameter marker, then the process of FIG. 2 continues with step 204. If the validity check determines that a query does not include any parameter markers, then the remaining steps of the process of FIG. 2 are skipped for that query.

In step 204, extract & transform tool 106 (see FIG. 1) loads (i.e., stores) the bind values collected in step 202 and related query execution information into PM tables 108 (see FIG. 1).

In another embodiment, the PM tables are not part of system 100 (see FIG. 1) and step 204 stores the query execution information and the collected bind values in another data structure (e.g., plain files). The related query execution information loaded in step 204 includes the text of the query, the query execution timestamp, and the duration of the query execution. The collection and storage of bind values and related query execution information in steps 202 and 204 are discussed in more detail below relative to FIG. 3A.

In step 206, plan space analyzer 110 (see FIG. 1) combines parameter marker bind value data collected and stored in steps 202 and 204 with database explain information retrieved from explain tables 112 (see FIG. 1). The details of step 206 are discussed below relative to FIG. 4A.

In step 208, plan space analyzer 110 (see FIG. 1) optionally creates diagrams 114 (see FIG. 1) such as frequency and/or plan space diagrams. In step 210, plan space analyzer 110 (see FIG. 1) generates a recommendation for an optimal reoptimization mode for the query. The optimal reoptimization mode recommended in step 210 is either ReOpt Once or ReOpt Always. The details of selecting between ReOpt Once and ReOpt Always in step 210 are described below relative to FIG. 4A. The optimization frequency determination process of FIG. 2 ends at step 212.

Collecting Bind Values

Figure 3A:
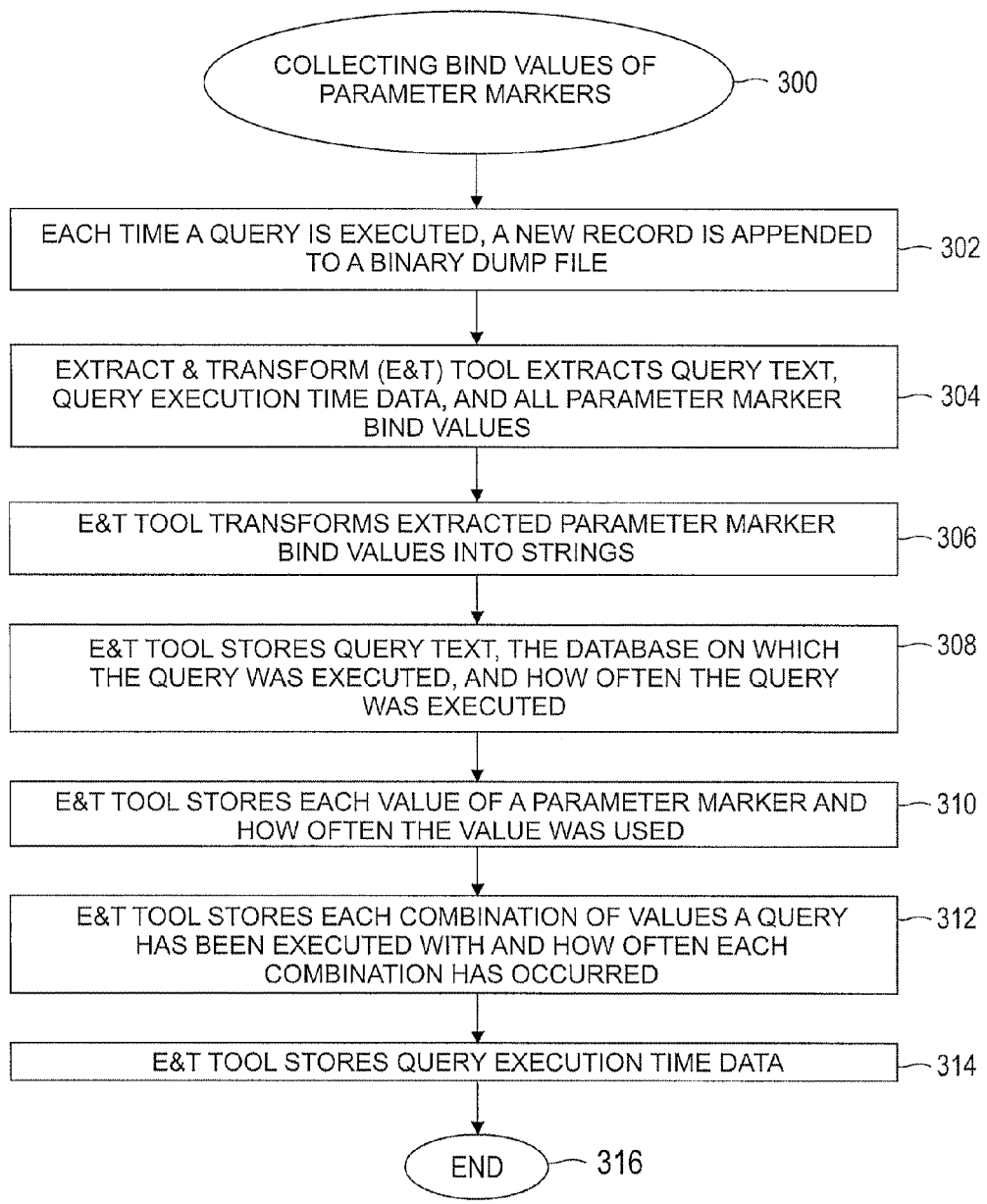
FIG. 3A is a flow diagram of a process of collecting bind values of parameter markers in the process of FIG. 2, in accordance with embodiments of the present invention.

FIG. 3A is a flow diagram of a process of collecting and storing bind values of parameter markers in the process of FIG. 2, in accordance with embodiments of the present invention. The collection and storage process of FIG. 2 incorporates query feedback information and starts at step 300. In step 302, each time a query is executed, a new record associated with the query execution is appended to binary dump file 104 (see FIG. 1). As one example, step 302 appends the new record to a RDSMon binary dump file that provides a DB2® feedback warehouse with information about the execution of queries. The feedback warehouse is filled with information about query executions that had a significant discrepancy between the optimizer's estimated costs and the actual query execution costs.

The contents of the record appended in step 302 include, for example, (1) a unique ID for the record, (2) query execution timestamp, (3) the amount of time taken to execute the query (a.k.a. query execution time), (4) the number of parameter markers included in the query, (5) the value type, value length and value of each parameter marker included in the query, (6) the text of the query statement, (7) the length of the query text, (8) the optimizer's estimated information and information length, and (9) the runtime counter's information and information length.

In step 304, extract & transform tool 106 (see FIG. 1) extracts information about the executions of queries having one or more parameter markers and the bind values associated with those queries. Step 304 extracts the query execution information and bind values from the records in binary dump file 104 (see FIG. 1). As one example, the step 304 data is extracted from the aforementioned RDSMon binary dump file. The data extracted in step 304 includes the text of the query statement, the query execution timestamp, the query execution time and all parameter marker bind values. A validity check (not shown) includes a check to determine whether the query includes at least one parameter marker and may include one or more other checks of the validity of the query execution information and bind values being extracted based on predefined criteria (e.g., check that the query text does not exceed a predetermined limit on the number of characters). If the validity check determines that the query does not include at least one parameter marker, then the remaining steps of FIG. 3A are not performed.

As all parameter marker bind values are saved in their original data type in the RDSMon file, extract & transform tool 106 (see FIG. 1) transforms the extracted parameter marker bind values into strings in step 306. The transformation in step 306 simplifies the handling and storage of the bind values.

In step 308, extract & transform tool 106 (see FIG. 1) stores the following items in a table of PM tables 108 (see FIG. 1): the query text, the database on which the query was executed, and a count of how many times the query was executed.

In step 310, extract & transform tool 106 (see FIG. 1) stores the following items in a table of PM tables 108 (see FIG. 1): an identifier of each parameter marker within the query, every actual bind value used for each parameter marker within the query, and a count of how many times a bind value was used for a parameter marker.

In step 312, extract & transform tool 106 (see FIG. 1) stores the following items in a table of PM tables 108 (see FIG. 1): each combination of bind values (i.e., bind value set) a query has been executed with and a count of how many times each combination occurred.

In step 314, extract & transform tool 106 (see FIG. 1) stores the following items in a table of PM tables 108 (see FIG. 1): a query execution timestamp for each query execution and an amount of time taken to execute the query for each query execution.

The tables referenced by steps 308, 310, 312 and 314 are described below relative to FIGS. 3C and 3D. The process of FIG. 3A ends at step 316.

FIG. 3B is an example of a binary dump file converted into a human readable format from which query information and bind values are extracted in the process of FIG. 3A, in accordance with embodiments of the present invention. A RDSMon binary dump file 320 includes examples of the query execution information, bind value information, optimizer estimations and runtime counter information described above relative to step 302 of FIG. 3A.

Storing Query Execution Information

FIG. 3C are examples of code for creating database tables that store the query information and bind values in the process of FIG. 3A, in accordance with embodiments of the present invention. Code 340 is an example of Data Definition Language (DDL) statements that generate four relational database tables PMQUERIES, PMVALUES, PMCOMBINATIONS AND PMEXECUTIONS. These relational database tables are examples of PM tables 108 (see FIG. 1). The PMQUERIES table includes columns for storing the data items described above relative to step 308 (see FIG. 3A). The PMVALUES table includes columns for storing the data items described above relative to step 310 (see FIG. 3A). The PMCOMBINATIONS table includes columns for storing the data items described above relative to step 312 (see FIG. 3A). The PMEXECUTIONS table includes columns for storing the data items described above relative to step 314 (see FIG. 3A). Complete descriptions of the four PM tables generated by DDL statements 340 are presented below relative to FIG. 3D.

Figure 3D:
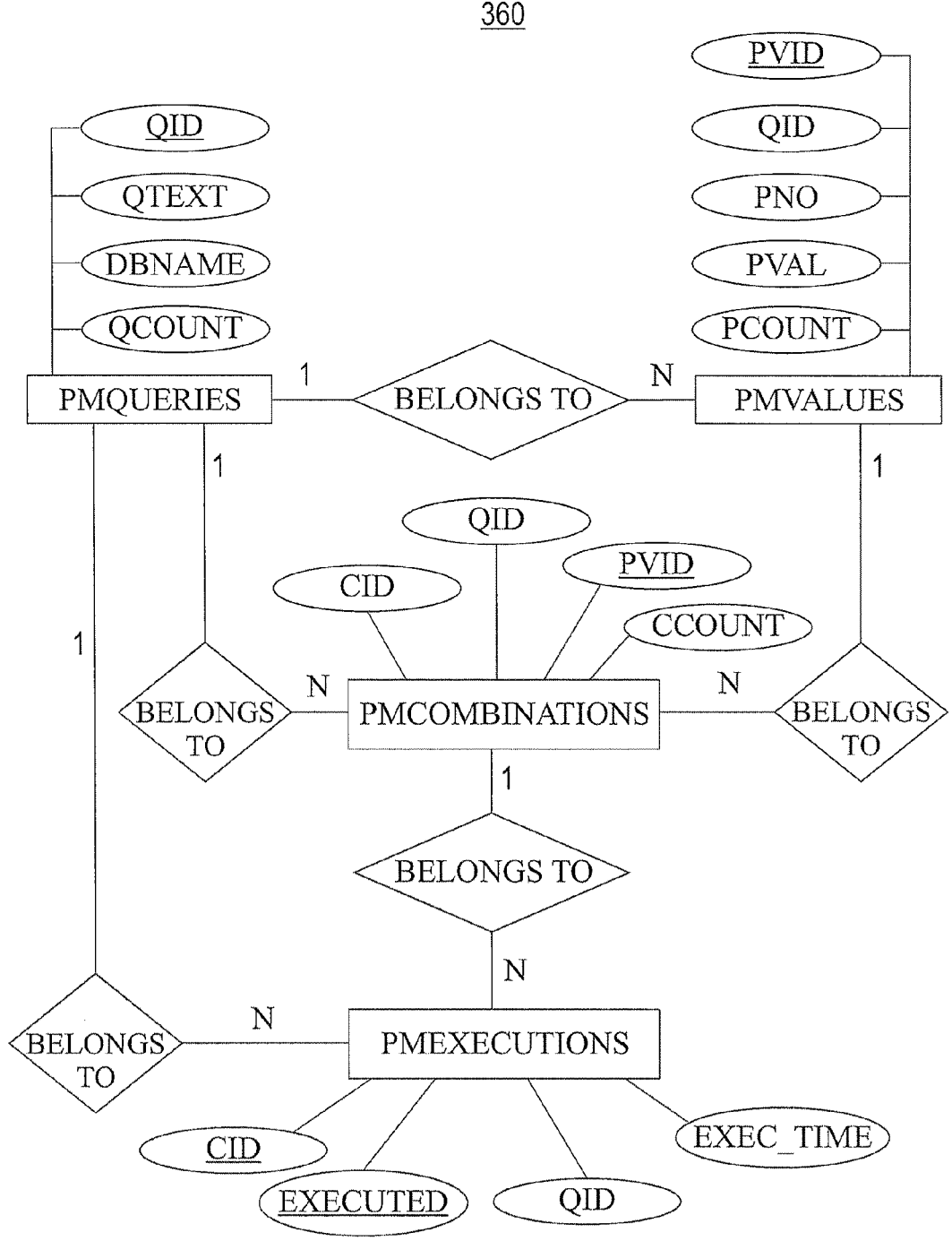
FIG. 3D is an entity-relationship model of the database tables that store the query information and bind values in the process of FIG. 3A, in accordance with embodiments of the present invention.

FIG. 3D is an entity-relationship (ER) model of the relational database tables that store the query information and bind values in the process of FIG. 3A, in accordance with embodiments of the present invention. ER model 360 illustrates the four PM tables created by the statements of FIG. 3C, their relationships and their respective columns. Each of the four PM tables in ER model 360 is described below.

PMQUERIES: Each row contains information about one query. The columns of PMQUERIES are described in Table 1.

TABLE 1

| PMQUERIES Column | Description |
| --- | --- |
| QID | Primary key column |
| QTEXT | Contains the query text having no more than a predefined maximum number of characters |
| DBNAME | Name of the database on which the query ran |
| CCOUNT | Counts how many times information about a certain query is added to the PM Tables. The counter is initialized with one when a new query is inserted. |

PMVALUES: Each row contains the bind value of one parameter marker. A row is deleted from PMVALUES if the query the row refers to is deleted from the PMQUERIES table. The columns of PMVALUES are described in Table 2.

TABLE 2

| PMVALUES Column | Description |
| --- | --- |
| QID | References a row in the PMQUERIES table and therefore references a specific query |
| PNO | Identifies the parameter marker within the query. For the first parameter marker, PNO has the value of one, for the second parameter marker, PNO has the value of two, etc. |
| PVID | Primary key column |
| PVAL | Stores the bind value of the parameter marker as a VARCHAR having no more than a predefined maximum number of characters |
| PVCOUNT | Counts how many times the value for a parameter marker has occurred, where the parameter marker is in the query specified by QID and on the parameter marker position specified by PNO |

PMCOMBINATIONS: This table combines one or more bind values to a bind value set. For each bind value set, one or more rows are inserted. A row is deleted from PMCOMBINATIONS if the query to which the row refers is deleted from the PMQUERIES table. The columns of PMCOMBINATIONS are described in Table 3.

TABLE 3

| PMCOMBINATIONS Column | Description |
| --- | --- |
| QID | References a row in the PMQUERIES table and therefore references a specific query. |
| CID | Primary key column |
| PVID | References a bind value in the PMVALUES table |
| CCOUNT | Counts how many times the bind value set of this row has occurred. |

PMEXECUTIONS: Each row stores information about one execution of a query. For every execution, a new row is inserted. The primary key is the combination of CID and EXECUTED. A row is deleted from PMEXECUTIONS if the query to which the row refers is deleted from the PMQUERIES table. The columns of PMEXECUTIONS are described in Table 4.

TABLE 4

| PMEXECUTIONS Column | Description |
| --- | --- |
| QID | References a row in the PMQUERIES table and therefore references a specific query |
| EXECUTED | Stores the time when the query was executed |
| CID | Stores the bind value set with which the query was executed |
| EXEC_TIME | Stores the time taken to execute the query |

In one embodiment, step 204 (see FIG. 2) includes the following storage process performed by extract & transform tool 106 (see FIG. 1) for each set of query execution data collected in step 202 (see FIG. 2). First, the query text and the database name (e.g., provided as a command line parameter) are inserted into the PMQUERIES table. If the combination of both values already exists, the associated counter QCOUNT is incremented by one. Otherwise, a new query identifier QID is received and the data is written to the PMQUERIES table. Second, all parameter marker bind values are inserted into the PMVALUES table according to the insertion of the query text. Third, the information about the combination of the bind values (i.e., the bind value set) is written to the PMCOMBINATIONS table. If the bind value set is already included in the PMCOMBINATIONS table, then the counter CCOUNT is incremented. Otherwise, a new bind value set identifier CID is generated and a row is inserted into the PMCOMBINATIONS table for each bind value of the bind value set. Finally, the query identifier, the bind value set identifier, the timestamp of the query's execution and the amount of time taken to execute the query are inserted into the PMEXECUTIONS table.

Plan Space Analysis

Figure 4A:
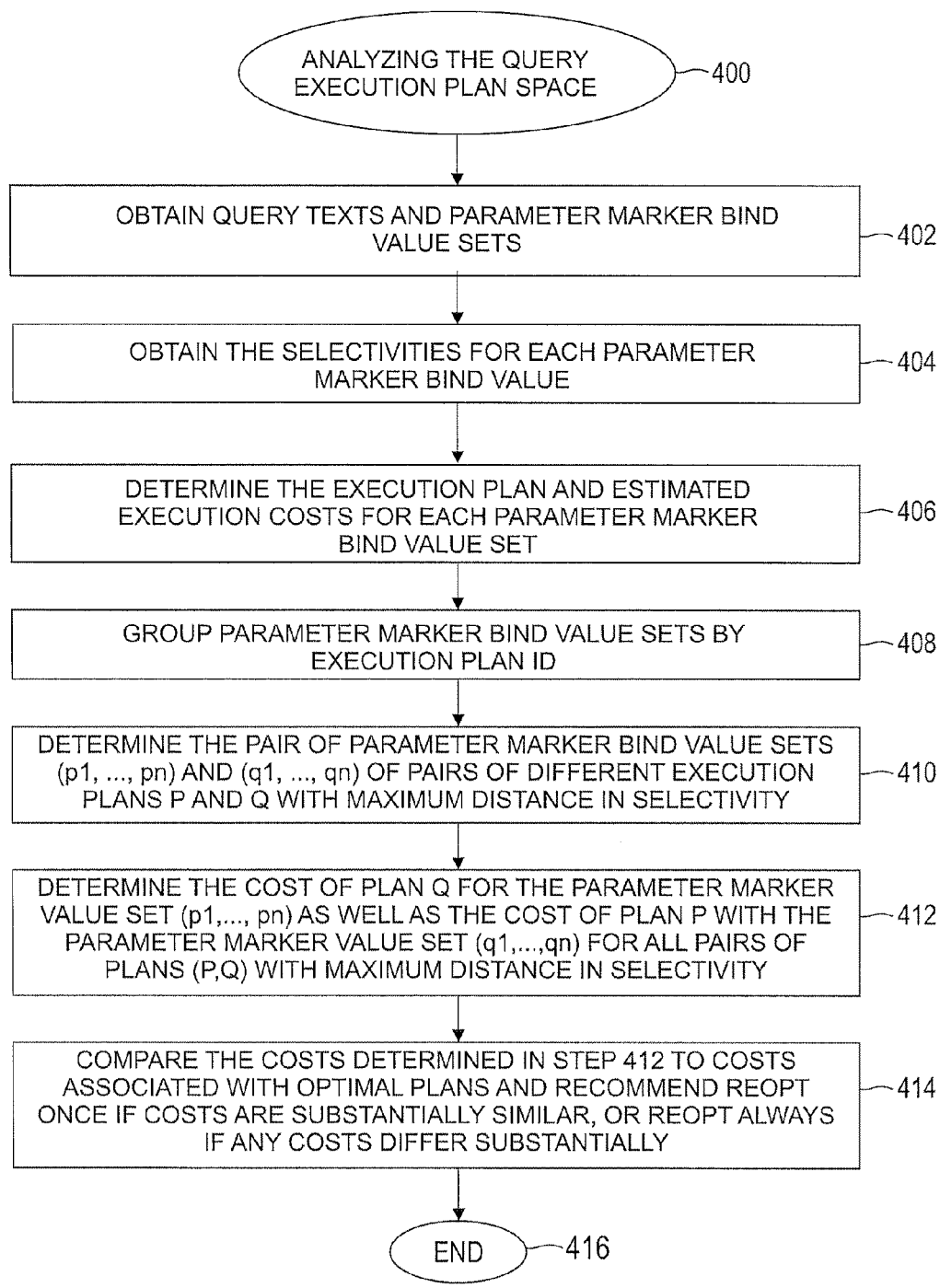
FIG. 4A is a process of analyzing a query execution plan space within the process of FIG. 2, in accordance with embodiments of the present invention.

FIG. 4A is a process of analyzing a query execution plan space within the process of FIG. 2, in accordance with embodiments of the present invention. The query execution plan space analysis process begins at step 400. In step 402, plan space analyzer 110 (see FIG. 1) requests and obtains the query text, the name of the database on which the query executed, and parameter marker bind value sets collected in step 202 (see FIG. 2). In one example, step 402 requests and obtains the query and bind value set information from PM tables 108 (see FIG. 1).

Prior to step 404, plan space analyzer 110 (see FIG. 1) employs a database facility to generate Explain information for each query whose query text is obtained in step 402 (hereinafter referred to as the "retrieved queries"). Generating Explain information for a query is also referred to herein as explaining the query (e.g., by composing and executing an EXPLAIN query). Each of the retrieved queries is explained with all of the retrieved query's bind value sets. In order to make each of the retrieved queries explainable, the retrieved query's one or more parameter markers are replaced by the bind values of one of the retrieved query's bind value sets. Via the Explain facility being used, the plan space analyzer assigns a query identifier (e.g., QUERYNO) to each bind value set and generates a query tag (e.g., QUERYTAG) for each of the retrieved queries. The generated query tag includes the current timestamp and a random number. As one example, each retrieved query is explained with its QUERYTAG and its bind value set's QUERYNO. Thus, the query identifier and query tag uniquely identifies the Explain information of every retrieved query for each of the query's bind value sets.

As one example, the plan space analyzer uses a DB2® facility to store Explain information in database tables called Explain tables. The Explain information stored in the Explain tables is generated while optimizing a query. If the Explain facility of DB2® is activated with the command SET CURRENT EXPLAIN MODE YES, the execution plan of a query is stored in the Explain tables when the query is executed.

As another example, Explain information is generated by composing and executing a Structured Query Language (SQL) statement EXPLAIN, which captures Explain information about the query execution plan for a supplied explainable statement and places the Explain information into Explain tables. An explainable statement is one of the following SQL statements: DELETE, INSERT, SELECT, SELECT INTO, UPDATE, VALUES, or VALUES INTO. The present invention employs the SQL EXPLAIN statement's SET QUERYNO and SET QUERYTAG options to set the aforementioned query identifiers and query tags, respectively, to uniquely identify the Explain information. A sample SQL EXPLAIN statement that explains a query prior to step 404 is shown in FIG. 4D.

In steps 404 and 406, plan space analyzer 110 (see FIG. 1) uses the query identifier and query tag to obtain Explain information from the aforementioned Explain tables for each bind value set of a retrieved query. In step 404, the Explain information obtained includes selectivities for all parameter marker predicates for each bind value set of each retrieved query. In another embodiment, cardinality measurements (a.k.a. absolute measurements) for each bind value set are obtained in step 404 instead of selectivities. In step 406, the Explain information obtained includes query execution plan information and estimated execution costs for each bind value set of each retrieved query. Each obtained estimated execution cost is an estimate of the cost of using an obtained query execution plan to optimally execute the retrieved query with a particular bind value set.

In one embodiment, the plan space analyzer assigns unique execution plan IDs to the query execution plans, so that all identical query execution plans have the same execution plan ID. In this case, step 406 obtains the execution plan ID instead of all of the query execution plan information.

In step 408, plan space analyzer 110 (see FIG. 1) groups parameter marker bind value sets by query execution plan ID. This grouping of parameter marker bind value sets by query execution plan ID is optionally displayed in a plan space diagram 114 (see FIG. 1).

In step 410, plan space analyzer 110 (see FIG. 1) determines one or more pairs of parameter marker bind value sets $(p1, \ldots, pn)_i$, $(q1, \ldots, qn)_i$ where $P_i$ is an optimal query execution plan associated with $(p1, \ldots, pn)_i$, $Q_i$ is an optimal query execution plan associated with $(q1, \ldots, qn)_i$ and $i \geq 1$. The plan space analyzer determines a distance $d_i$ between a first selectivity measurement set (i.e., a set of one or more selectivity measurements) associated with $(p1, \ldots, pn)_i$ and a second selectivity measurement set associated with $(q1, \ldots, qn)_i$. Each distance $d_i$ is a maximum distance between any pair of selectivity measurement sets, where the first selectivity measurement set of the pair is associated with query execution plan $P_i$ and the second selectivity measurement set of the pair is associated with $Q_i$. In another embodiment, step 410 determines the bind value set pairs that are associated with maximum distances between cardinality measurements.

In step 412, for the one or more bind value set pairs determined in step 410, plan space analyzer 110 (see FIG. 1) determines one or more pairs of execution costs $C1_i$ and $C2_i$ where $C1_i$ is an estimated cost of executing the query via forcing the use of bind value set $(q1, \ldots, qn)_i$ with query execution plan $P_i$ and where $C2_i$ is an estimated cost of executing the query via forcing the use of bind value set $(p1, \ldots, pn)_i$ with query execution plan $Q_i$. This forcing of bind value sets with sub-optimal query execution plans is referred to herein as cross-forced plans.

In step 414, plan space analyzer 110 (see FIG. 1) compares each of the costs determined in step 412 with the cost of executing the query via a corresponding optimal query execution plan. The plan space analyzer determines one or more pairs of differences $D1_i$, $D2_i$, where $D1_i$ is a difference between execution cost $C1_i$ and an optimal execution cost $OC1_i$ and $D2_i$ is a difference between execution cost $C2_i$ and an optimal execution cost $OC2_i$. Optimal execution costs $OC1_i$ and $OC2_i$ are included in the execution costs determined in step 406. $OC1_i$ is a cost of optimally executing the query via query execution plan $Q_i$ with bind value set $(q1, \ldots, qn)_i$ and $OC2_i$ is a cost of optimally executing the query via query execution plan $P_i$ with bind value set $(p1, \ldots, pn)_i$.

If none of the differences in the one or more pairs of differences $D1_i$, $D2_i$ exceed a predefined threshold value (i.e., the costs in each pair of costs compared in step 414 are substantially similar), then plan space analyzer 110 (see FIG. 1) recommends ReOpt Once as the optimization frequency for the query being analyzed. On the other hand, if at least one difference of the one or more pairs of differences $D1_i$, $D2_i$ exceeds the predefined threshold value (i.e., costs in at least one of the pairs of costs compared in step 414 differ substantially), then plan space analyzer 110 (see FIG. 1) recommends ReOpt Always as the optimization frequency for the query being analyzed.

FIG. 4B is an example of a table from which query information and bind value sets are requested and obtained in the process of FIG. 4A, in accordance with embodiments of the present invention. Table 420 includes examples of a query text, a database name and bind value sets requested and obtained by plan space analyzer 110 (see FIG. 1) in step 402 of FIG. 4A. Each parameter marker in the query text in table 420 is indicated by a question mark. In one embodiment, the query text, database name and bind value sets are obtained from PM tables 108 (see FIG. 1).

FIG. 4C is an example of a query in which parameter markers are replaced by bind values, where the query's text is obtained from the table in FIG. 4B, in accordance with embodiments of the present invention. After step 402 (see FIG. 4A), the one or more parameter markers of the query being analyzed by the process of FIG. 4A are replaced by the one or more bind values in the bind value set obtained in step 402 (see FIG. 4A) and the resulting query is explained. Query 430 is an example of a query in which the two bind values of the first listed bind value set in table 420 (see FIG. 4B) replace their corresponding parameter markers in the query text of table 420 (see FIG. 4B). That is, the first listed bind value set in FIG. 4B is (1998, 63817) and therefore in query 430, 1998 and 63817 replace the first question mark and second question mark, respectively, in the query text of FIG. 4B. Explaining query 430 is illustrated in FIG. 4D.

FIG. 4D is an example of an Explain query generated from the query in FIG. 4C, in accordance with embodiments of the present invention. Explain query 440 is an example of a query used to explain query 430 (see FIG. 4C) subsequent to replacing a query's parameter markers with the bind values of a bind value set obtained in step 402 (see FIG. 4A). For each query being considered by the analysis process of FIG. 4A, an Explain query is composed and executed for each bind value set. The execution of each Explain query results in a query execution plan. The combination of QUERYTAG and QUE- RYID in Explain query 440 is unique and is used to identify the explain information later in the process of FIG. 4A.

Comparing Execution Costs

Although not shown in FIG. 4A, an initial criterion in the decision to use ReOpt Once or ReOpt Always is the number of different query execution plans associated with the query whose plan space is being analyzed. If only one query execution plan is determined in step 406 (see FIG. 4A) for all bind value sets obtained in step 402 (see FIG. 4A), then ReOpt Once is selected as the recommended optimal optimization frequency and the subsequent analysis steps of FIG. 4A are not required. In this case, ReOpt Always has the same execution cost as using ReOpt Once because ReOpt Always uses the same query execution plan after each reoptimization, but the optimization cost of ReOpt Always is significantly higher than using ReOpt Once.

If more than one query execution plan is determined for a query in step 406 (see FIG. 4A), then plan space analyzer 110 (see FIG. 1) makes an optimization frequency recommendation based on comparisons of estimated execution costs.

If a query is explained in step 406 (see FIG. 4A) with more than one query execution plan, then plan space analyzer 110 (see FIG. 1) recommends ReOpt Once in step 414 (see FIG. 4A) if using any of the query execution plans for all bind value sets does not result in execution costs that differ significantly from the execution costs associated with using the optimal query execution plan in each case. Otherwise, the plan space analyzer recommends ReOpt Always as the optimization frequency. That is, ReOpt Always is recommended if using any of the query execution plans for all bind value sets results in execution costs that differ significantly from the execution costs associated with using the optimal query execution plan in each case.

Figure 4E:
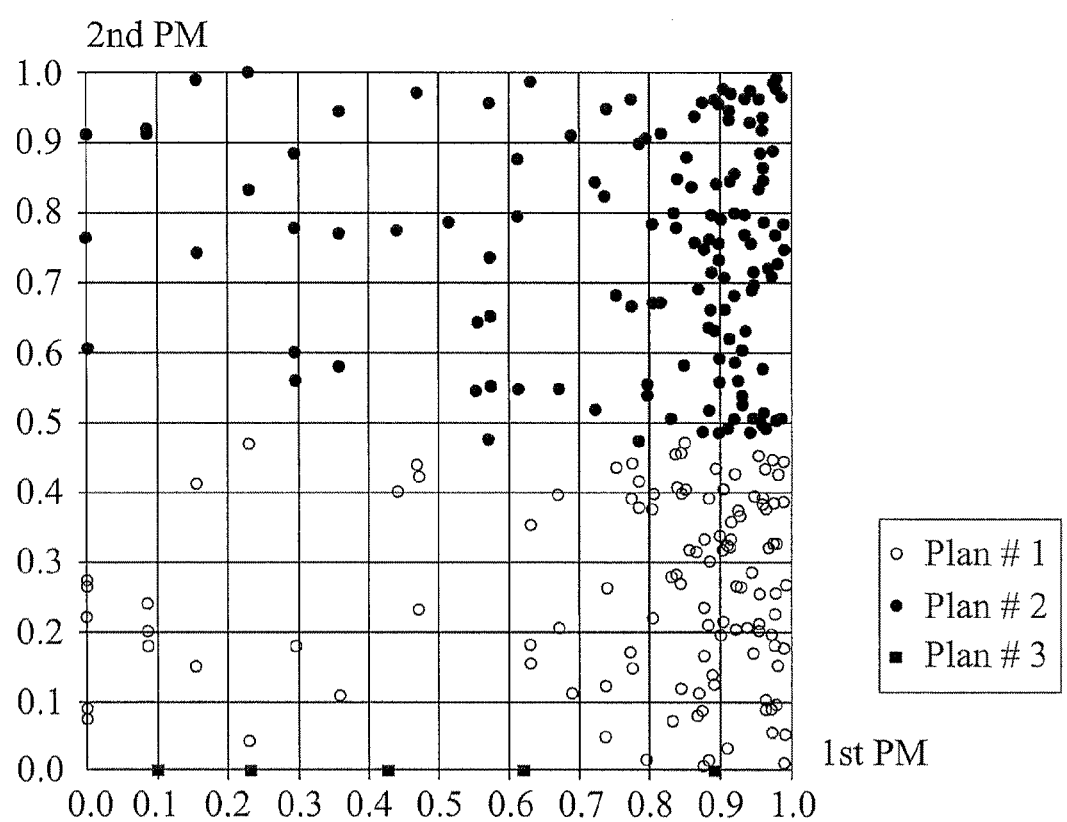
FIG. 4E is an exemplary plan space diagram illustrating a query execution plan space being analyzed by the process of FIG. 4A, in accordance with embodiments of the present invention.
Figure 4F:
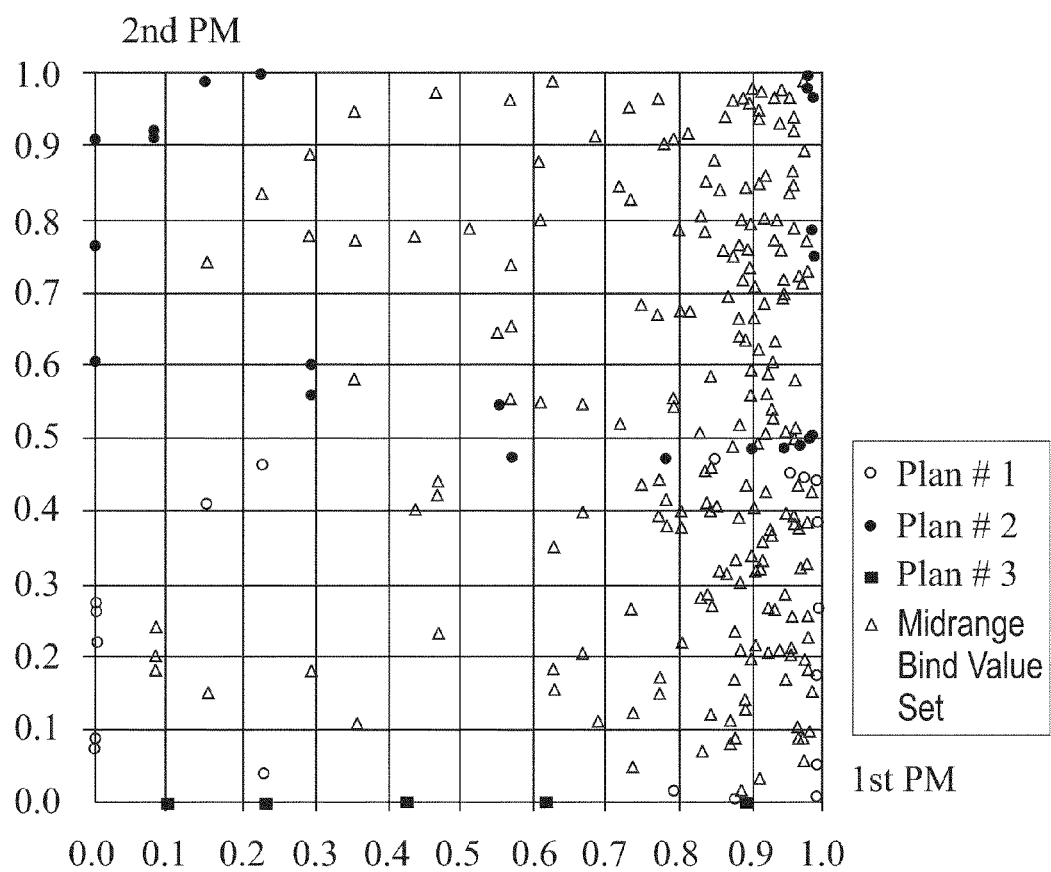
FIG. 4F is an exemplary plan space diagram illustrating a sorting out of bind value sets for determining a cost difference in the process of FIG. 4A, in accordance with embodiments of the present invention.
Figure 4G:
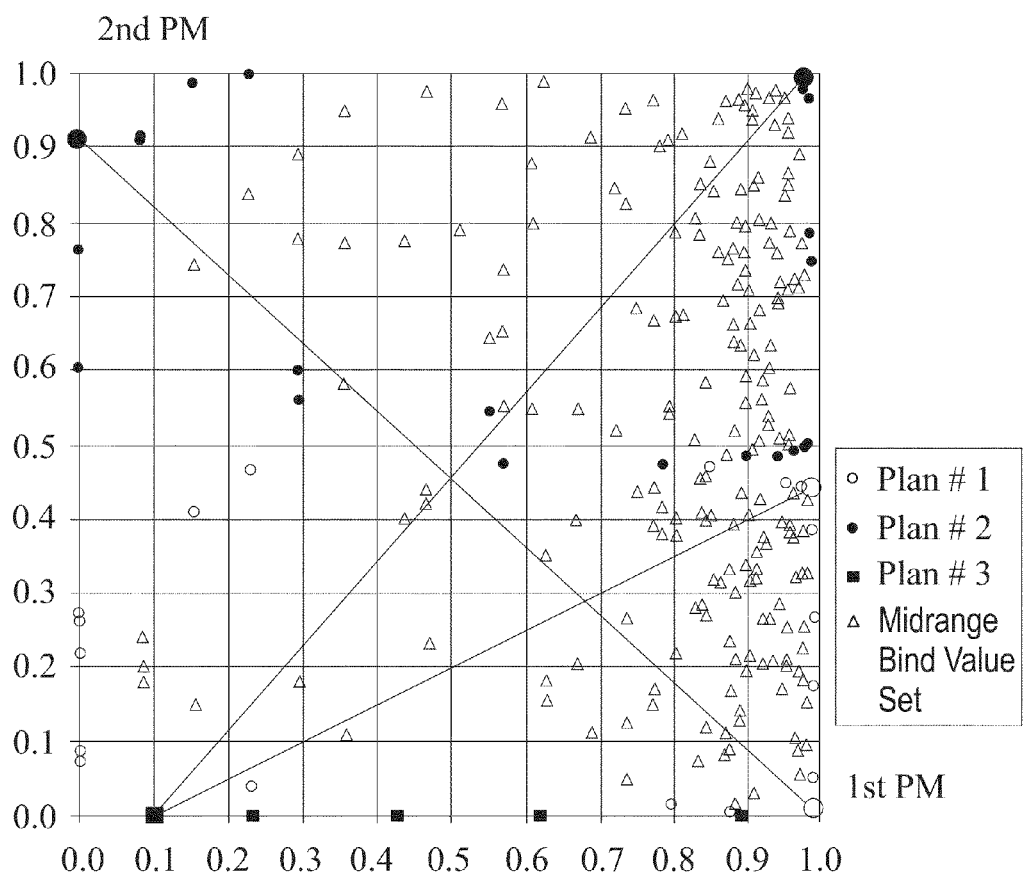
FIG. 4G is an exemplary plan space diagram illustrating a determination of pairs of bind value sets having a maximum distance in selectivity for determining a cost difference in the process of FIG. 4A, in accordance with embodiments of the present invention.

Assuming the worst case, the maximum difference in execution costs for a bind value set has to be determined. However, comparing the execution costs of all bind value sets of a query for all query execution plans is very expensive and time consuming. To reduce the number of cost comparisons, plan space analyzer 110 (see FIG. 1) selects suitable bind value sets to be compared. An example of selecting suitable bind value sets and making the cost comparisons is illustrated in FIGS. 4E-4G.

The selection of bind value sets for the execution cost comparison is based on the distance of their bind values in selectivity. The optimizer's choice of the optimal execution plan is heavily dependent on the selectivity of local predicates. In another embodiment, the selection of the bind value sets for the execution cost comparison is based on distances between cardinality measurements.

In the description of selecting bind value sets that follows, A is a set of the bind value sets $A_1$ to $A_m$ and B is a set of bind value sets $B_1$ to $B_n$, as shown in (1) and (2) presented below. All bind value sets of A and B are bind value sets of the query Q.

$$A=\{A_1, A_2, \ldots, A_m\} \quad (1)$$

$$B=\{B_1, B_2, \ldots, B_n\} \quad (2)$$

All bind value sets of A use $P_A$ as the optimal execution plan and all bind value sets of B use $P_B$ as the optimal execution plan, as shown in (3) and (4) presented below:

$$A \rightarrow P_A \quad (3)$$

$$B \rightarrow P_B \quad (4)$$

C(V,P) is the estimated execution cost of the query Q with the bind value set V and the execution plan P.

$D_A$ and $D_B$ are the differences in execution costs between using $P_A$ and $P_B$, as shown in (5) and (6) presented below:

$$D_A = C(A_i, P_B) - C(A_i, P_A) \quad (5)$$

$$D_B = C(B_j, P_A) - C(B_j, P_B) \quad (6)$$

$D_A$ and $D_B$ are supposed to be maximal if the value sets $A_i$ and $B_j$ have a maximum distance in selectivity to each other because of the execution plan's dependency on selectivity.

Therefore, the criterion for selecting bind value sets is the distance between bind value sets in selectivity. For each combination of two query execution plans $P_A$ and $P_B$, one pair of bind value sets $A_i$ and $B_j$ is selected. $A_i$ and $B_j$ are the bind value sets with the maximum distance in selectivity.

The process of selecting bind value sets is illustrated by plan space diagrams in FIGS. 4E-4G. A plan space diagram shows the distribution of execution plans in the selectivity space of a query. The selectivity measurements of the parameter marker predicates are plotted on the axes of the coordinate system of a plan space diagram. In another embodiment, cardinality measurements of the parameter marker predicates are plotted on the axes. Each point represents one bind value set. In FIGS. 4E-4G, the shape and fill color of a circular or rectangular point on a plan space diagram indicates the query execution plan associated with the bind value set represented by that point. The number of parameter markers in a query whose plan space is being analyzed is equivalent to the number of dimensions in the plan space diagram.

FIG. 4E is an exemplary plan space diagram illustrating a query execution plan space being analyzed by the process of FIG. 4A, in accordance with embodiments of the present invention. Plan space diagram 450 illustrates the plan space of a query that has two parameter markers. The bind value sets indicated by the points in plan space diagram 450 are grouped by execution plan ID in step 408 of FIG. 4A. In this case, each bind value set is associated with one of three query execution plans (i.e., Plan 1, Plan 2 and Plan 3), which are indicated in diagram 450 by the white-filled circles (i.e., Plan 1), black-filled circles (i.e., Plan 2) and the black-filled rectangles (i.e., Plan 3).

The goal of the selection of the bind value sets is it to determine pairs of points on a plan space diagram where the bind value sets represented by each pair of points are associated with different query execution plans Plan I and Plan II and where the points are at a maximum distance from each other, as compared to other pairs of points also associated with Plan I and Plan II. In one embodiment, distances between all points on a plan space diagram are calculated to determine the aforementioned pairs of points.

In equation (7a) presented below, $D_E$ is the Euclidean distance between two points P and Q in an n-dimensional space.

$$D_E = \sqrt{\sum_{i=1}^{n} (P_i - Q_i)^2} \quad (7a)$$

For comparison purposes, a distance measure D is sufficient, as shown below in expression (7b). The cost of the computation of the distance D is denoted by C(D).

$$D = \sum_{i=1}^{n} (P_i - Q_i)^2 \quad (7b)$$

The overall cost to select desired points out of m points in an n-dimensional space is shown below in expression (8):

$$\left(\frac{m*(m-1)}{2}\right)*C(D) \qquad (8)$$

As the overall cost represented by expression (8) rises quadratically for an increasing number of points and linearly for an increasing number of dimensions, the method of selecting bind value sets by calculating the distances between all points in a plan space diagram is expensive.

In a second embodiment, in order to reduce the number of distance calculations and male the process less expensive, each point in a plan space diagram that is totally surrounded by points associated with the same query execution plan as the point being considered is ignored (a.k.a. sorted out) in the determination of the maximum distances. Points in plan space diagram 450 that are sorted out are indicated by triangular points in a plan space diagram 460 of FIG. 4F. In other words, points that indicate bind value sets with minimum or maximum selectivities remain as circular or rectangular points in FIG. 4F, but points representing midrange bind value sets are ignored to simplify the maximum distances determination in step 410 of FIG. 4A.

A point P is totally surrounded if in every orthant of an n-dimensional Cartesian coordinate system with its origin in the point P, a point with the same shape and fill color as P exists. After a point is classified as surrounded, the point cannot be used to surround other points. Therefore, in an n-dimensional space, at least $2^n$ points are not surrounded by other points with the same shape and fill color.

The costs for this algorithm for m points and n dimensions are shown below in expressions (9) and (10), where C(P) denotes the cost to compare the position of two points. In the worst case (i.e., expression (9)), no bind value set is sorted out. In the best case (i.e., expression (10)), all bind value sets are sorted out except for the aforementioned $2^n$ points.

$$\text{worst case: } (m*(m-1))*C(P) \qquad (9)$$

$$\text{best case: } \left((m-n^2)*\left(\frac{m+n^2-1}{2}\right)\right)*C(P) \qquad (10)$$

Using the sort out algorithm to reduce the number of points to be considered for the distance calculation, the final costs for m points and n dimensions are presented below in expressions (11) and (12), in which C(D) is the cost of the distance calculation and C(P) is the cost to compare the position of two points.

$$\text{worst case: } [(m*(m-1))*C(P)] + \left[\left(\frac{m*(m-1)}{2}\right)*C(D)\right] \qquad (11)$$

best case:

$$\left[\left((m-n^2)*\left(\frac{m+n^2-1}{2}\right)\right)*C(P)\right] + \left[\left(\frac{n^2*(n^2-1)}{2}\right)*C(D)\right] \qquad (12)$$

In the worst case (i.e., expression (11)), no point is sorted out and every point is combined two times with every other point. Comparing the worst case (i.e., expression (11)) to the original costs in expression (8) presented above, the worst case is three times as expensive as the original cost of determining the distances between all points.

Comparing the best case (i.e., expression (12)) with the original costs in expression (8), the number of distance computations is reduced to $2^n$.

After using the sort out algorithm to generate plan space diagram 460 in FIG. 4F, maximum distances between selectivity measurements in the plan space diagram are determined in step 410 (see FIG. 4A). The maximum selectivity distances are between bind value sets associated with different query execution plans. The line segments drawn between the larger circular or rectangular points in plan space diagram 470 in FIG. 4G indicate the maximum selectivity distances. The larger circular or rectangular points at the endpoints of a line segment in FIG. 4G represent a pair of bind value sets used in a determination of estimated execution costs in step 412 (see FIG. 4A). Hereinafter, each pair of bind value sets identified in step 410 (see FIG. 4A) is also referred to as an identified pair. Thus, the three line segments joining points in FIG. 4G identify three pairs of bind value sets. That is, a first line segment joins a first pair of bind value sets associated with Plan 1 and Plan 2, a second line segment joins a second pair of bind value sets associated with Plan 1 and Plan 3, and a third line segment joins a third pair of bind value sets associated with Plan 2 and Plan 3.

After identifying the pairs of bind value sets that have a maximum distance in selectivity, the differences in estimated execution costs are determined in step 414 (see FIG. 4A). Each difference determined in step 414 (see FIG. 4A) is between a first execution cost of sub-optimally executing a query with a first query execution plan that is forced to use a bind value set of an identified pair and a second execution cost of optimally executing the query with a second query execution plan using the same bind value set. The first execution plan is the plan for optimally executing the query with the other bind value set in the identified pair.

As the optimal execution costs for each bind value set in the identified pairs are already known from the explain information generated in step 206 (see FIG. 2), step 412 (see FIG. 4A) does not need to determine those optimal execution costs. In step 412, for each query execution plan associated with a bind value set in an identified pair, plan space analyzer 110 (see FIG. 1) determines the suboptimal execution cost of forcing the query execution plan to use the other bind value set in the identified pair. This determination of the suboptimal execution costs in step 412 is performed via explaining the query with cross forced plans. Thus, for each identified pair of bind value sets A and B, which are associated with optimal query execution plans P and Q, respectively, the query is explained in step 412 to determine a first suboptimal execution cost of using query execution plan P with bind value set B and a second suboptimal execution cost of using query execution plan Q with bind value set A.

In one embodiment, a database hint feature is employed in step 412 (see FIG. 4A) to force the query to use suboptimal query execution plans and subsequently determine the aforementioned suboptimal execution costs. As one example, a database hint is a syntax addition to a SQL query (e.g., embedded within a comment of the SQL query) that overrides the database optimizer and controls the execution plan of the SQL query.

After explaining the query with all of the identified pairs of bind value sets using cross forced plans, the differences determined between the suboptimal execution costs and the optimal costs are analyzed in step 414 (see FIG. 4A). If all of the differences do not exceed a predefined threshold value, then plan space analyzer 110 (see FIG. 1) recommends ReOpt Once as the optimization frequency for the query. That is, ReOpt Once is recommended if each suboptimal execution cost and its associated optimal execution cost determined in step 412 (see FIG. 4A) are substantially similar. The predefined threshold value takes into account the optimization costs associated with ReOpt Always.

If any of the differences determined in step 414 (see FIG. 4A) exceed the predefined threshold value, then plan space analyzer 110 (see FIG. 1) recommends ReOpt Always as the optimization frequency for the query. That is, ReOpt Always is recommended if any suboptimal execution cost determined in step 412 of FIG. 4A and its associated optimal execution cost determined in step 206 of FIG. 2 differ substantially.

In the case of the three identified pairs of bind value sets in plan space diagram 470, six suboptimal execution costs are determined in step 412 (see FIG. 4A) and six comparisons are made in step 414 to determine six differences between the suboptimal execution costs and their associated optimal execution costs.

Computing System

Figure 5:
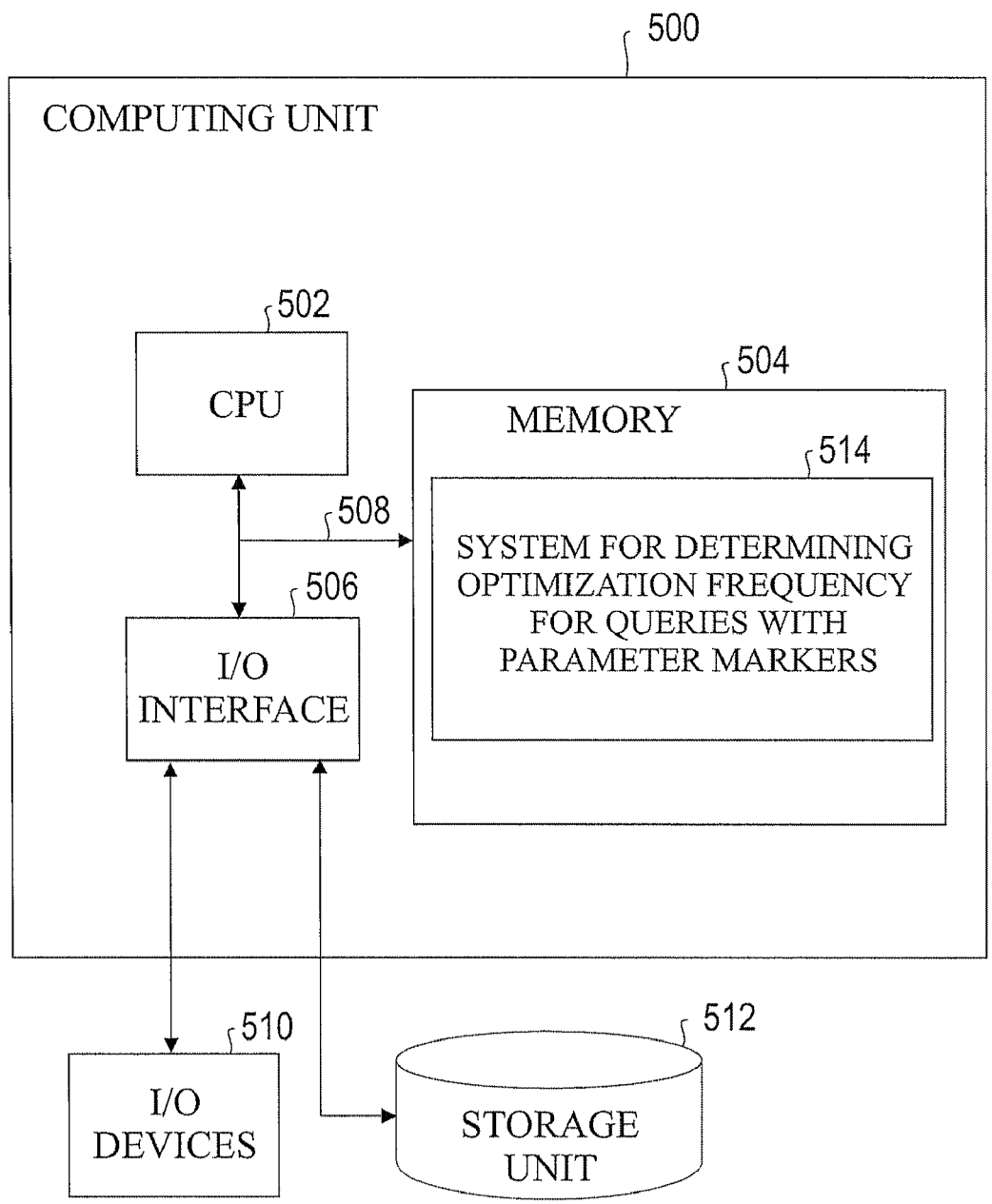
FIG. 5 is a computing system that includes components of the system of FIG. 1 and implements the processes of FIGS. 2, 3A and 4A, in accordance with embodiments of the present invention.

FIG. 5 is a computing system that includes components of the system of FIG. 1 and implements the processes of FIGS. 2, 3A and 4A, in accordance with embodiments of the present invention. Computing unit 500 is suitable for storing and/or executing program code of a system for automatically determining optimization frequencies of queries with parameter markers 514, and generally comprises a central processing unit (CPU) 502, a memory 504, an input/output (I/O) interface 506, a bus 508, I/O devices 510 and a storage unit 512. Optimization frequency determination system 514 includes, for example, extract & transform tool 106 (see FIG. 1) and plan space analyzer 110 (see FIG. 1). CPU 502 performs computation and control functions of computing unit 500. CPU 502 may comprise a single processing unit, or be distributed across one or more processing units in one or more locations (e.g., on a client and server).

Local memory elements of memory 504 are employed during actual execution of the program code of optimization frequency determination system 514. Cache memory elements of memory 504 provide temporary storage of at least some program code in order to reduce the number of times code must be retrieved from bulk storage during execution. Further, memory 504 may include other systems not shown in FIG. 5, such as an operating system (e.g., Linux) that runs on CPU 502 and provides control of various components within and/or connected to computing unit 500.

Memory 504 may comprise any known type of data storage and/or transmission media, including bulk storage, magnetic media, optical media, random access memory (RAM), read-only memory (ROM), a data cache, a data object, etc. Storage unit 512 is, for example, a magnetic disk drive or an optical disk drive that stores data. Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including a display monitor, keyboard, mouse, printer, speakers, handheld device, printer, facsimile, etc. Bus 508 provides a communication link between each of the components in computing unit 500, and may comprise any type of transmission link, including electrical, optical, wireless, etc.

I/O interface 506 also allows computing unit 500 to store and retrieve information (e.g., program instructions or data) from an auxiliary storage device (e.g., storage unit 512). The auxiliary storage device may be a non-volatile storage device (e.g., a CD-ROM drive which receives a CD-ROM disk). Computing unit 500 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of optimization frequency determination system 514 for use by or in connection with a computing unit 500 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 504, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically determining an optimization frequency of a query having one or more parameter markers, said method comprising:

obtaining, by a computing system, a plurality of bind value sets and a plurality of measurement sets associated with said bind value sets in a one-to-one correspondence, each bind value set including one or more bind values and associated with said one or more parameter markers of said query, and each measurement set selected from the group consisting of one or more selectivity measurements and one or more cardinality measurements;

generating, by said computing system, a plurality of query execution plans for an execution of said query, each query execution plan capable of optimally executing said query with one or more bind value sets of said plurality of bind value sets;

determining, by said computing system, a plurality of optimal execution costs, each optimal execution cost being a cost of optimally executing said query with a corresponding bind value set of said plurality of bind value sets;
determining, by said computing system, first and second query execution plans of said plurality of query execution plans that have a maximum distance between a first measurement set associated with said first query execution plan and a second measurement set associated with said second query execution plan, wherein said first and second measurement sets are included in said plurality of measurement sets, and wherein said plurality of optimal execution costs includes a first optimal execution cost of optimally executing said query via said first query execution plan with a first bind value set of said plurality of bind value sets, and further includes a second optimal execution cost of optimally executing said query via said second query execution plan with a second bind value set of said plurality of bind value sets;
determining, by said computing system, a first execution cost of executing said query via said first query execution plan with said second bind value set and a second execution cost of executing said query via said second query execution plan with said first bind value set;
said computing system determining a first difference between said first execution cost and said first optimal execution cost, and a second difference between said second execution cost and said second optimal execution cost;
said computing system determining at least one difference of said first and second differences exceeds a predefined threshold value;
based on said determining said at least one difference exceeds said predefined threshold value, said computing system automatically selecting a frequency of optimizing said query to be reoptimizing said query each time said query is executed instead of selecting optimizing said query only once; and
based on said automatically selected frequency of optimizing said query, said computing system executing said query on a database for each bind value set of said plurality of bind value sets, wherein a result of said executing said query is a reduction of a total cost of ownership of said database.

2. The method of claim 1, further comprising collecting parameter marker data by said computing system, said parameter marker data including said plurality of bind value sets, wherein said collecting said parameter marker data comprises:
extracting, from a record of a binary dump file provided by a database feedback warehouse system, query information and said first bind value set of said plurality of bind value sets, said query information including a text of said query, a timestamp indicating an execution of said query, and an amount of time taken by said execution of said query; and
storing said query information and said first bind value set in a plurality of relational database tables.

3. The method of claim 2, wherein said first bind value set includes one or more actual values of said one or more parameters or one or more selectivities of one or more bind values of said first bind value set.

4. The method of claim 1, further comprising collecting parameter marker data by said computing system, said parameter marker data including said plurality of bind value sets, wherein said collecting said parameter marker data comprises:
parsing said query with a Structured Query Language (SQL) parser;
identifying one or more database columns referred to by one or more predicates that include said one or more parameter markers;
obtaining single-column database statistics associated with said one or more database columns;
collecting said plurality of bind value sets from said single-column database statistics; and
determining selectivities of said plurality of bind value sets from said single-column database statistics.

5. The method of claim 1, further comprising collecting parameter marker data by said computing system, said parameter marker data including said plurality of bind value sets, wherein said collecting said parameter marker data comprises:
parsing said query with a Structured Query Language (SQL) parser;
identifying one or more database columns referred to by one or more predicates that include said one or more parameter markers; and
selecting, via random sampling, said plurality of bind value sets from said one or more database columns.

6. A computer program product, comprising a computer-readable, tangible storage device having a computer-readable program code stored therein, said computer-readable program code containing instructions that are carried out by a processor of a computer system to implement the method of claim 1.

7. The method of claim 1, further comprising:
obtaining, by said computing system, a second plurality of bind value sets and a second plurality of measurement sets associated with said second bind value sets in a one-to-one correspondence, each bind value set of said second plurality of bind value sets including at least one bind value and associated with said one or more parameter markers of a second query, and each measurement set of said second plurality of measurement sets selected from the group consisting of one or more selectivity measurements and one or more cardinality measurements;
generating, by said computing system, a second plurality of query execution plans for an execution of said second query, each query execution plan of said second plurality of query execution plans capable of optimally executing said second query with one or more bind value sets of said second plurality of bind value sets;
determining, by said computing system, a set of optimal execution costs associated with said query execution plans of said second plurality of query execution plans in a one-to-one correspondence, each optimal execution cost of said set of optimal execution costs being a cost of optimally executing said second query with a bind value set of said second plurality of bind value sets;
determining, by said computing system, one or more pairs of bind value sets $(p1, \ldots, pn)_i$, $(q1, \ldots, qn)_i$ of said second plurality of bind value sets, said determining said one or more pairs of bind value sets including determining one or more distances $d_i$ between a first measurement set $S1_i$ associated with said bind value set $(p1, \ldots, pn)_i$ and a second measurement set $S2_i$ associated with said $(q1, \ldots, qn)_i$, said $S1_i$ and said $S2_i$ included in said second plurality of measurement sets, wherein each distance $d_i$ is a maximum distance between any pair of measurement sets associated with query execution plans $P_i$ and $Q_i$ of said second plurality of query execution plans, wherein said query execution plan $P_i$ optimally executes said second query with said bind value set (p1, ..., pn)$_i$ and said query execution plan Q$_i$ optimally executes said second query with said bind value set (q1, ..., qn)$_i$, and wherein said i≧1;

determining, by said computing system, one or more pairs of execution costs C1$_i$, C2$_i$, wherein said C1$_i$ is a cost of executing said second query via said query execution plan P$_i$ with bind value set (q1, ..., qn)$_i$ and said C2$_i$ is a cost of executing said second query via said query execution plan Q$_i$ with bind value set (p1, ..., pn)$_i$, wherein said determining said one or more pairs of execution costs C1$_i$, C2$_i$ includes:

using a database hint to force said second query to use said query execution plan P$_i$ with bind value set (q1, ..., qn)$_i$, and using said database hint to force said second query to use said query execution plan Q$_i$ with bind value set (p1, ..., pn)$_i$;

determining, by said computing system, one or more pairs of differences D1$_i$ and D2$_i$, wherein said D1$_i$ is a difference between said cost C1$_i$ and an optimal execution cost OC1$_i$ of said set of optimal execution costs and said D2$_i$ is a difference between said cost C2$_i$ and an optimal execution cost OC2$_i$ of said set of optimal execution costs, wherein said OC1$_i$ is a cost of optimally executing said second query via said query execution plan Q$_i$ with bind value set (q1, ..., qn)$_i$, and said OC2$_i$ is a cost of optimally executing said second query via said query execution plan P$_i$ with bind value set (p1, ..., pn)$_i$;

determining, by said computing system, each difference of said one or more pairs of differences D1$_i$ and D2$_i$ does not exceed said predefined threshold value;

based on said determining each difference of said one or more pairs of differences does not exceed said predefined threshold value, said computing system automatically selecting a second frequency of optimizing said second query to be optimizing said second query only once instead of reoptimizing said second query each time said second query is executed; and based on said automatically selected second frequency of optimizing said second query, said computing system executing said second query on said database for each bind value set of said second plurality of bind value sets, wherein a result of executing said second query is said reduction of said total cost of said database.

8. A computing system comprising a processor coupled to a computer-readable memory unit, said memory unit comprising a software application and instructions that when executed by said processor implement a method of automatically determining an optimization frequency of a query having one or more parameter markers, said method comprising:

obtaining, by said computing system, a plurality of bind value sets and a plurality of measurement sets associated with said bind value sets in a one-to-one correspondence, each bind value set including one or more bind values and associated with said one or more parameter markers of said query, and each measurement set selected from the group consisting of one or more selectivity measurements and one or more cardinality measurements;

generating, by said computing system, a plurality of query execution plans for an execution of said query, each query execution plan capable of optimally executing said query with one or more bind value sets of said plurality of bind value sets;

generating, by said computing system, a plurality of query execution plans for an execution of said query, each query execution plan capable of optimally executing said query with one or more bind value sets of said plurality of bind value sets;

determining, by said computing system, a plurality of optimal execution costs, each optimal execution cost being a cost of optimally executing said query with a corresponding bind value set of said plurality of bind value sets;

determining, by said computing system, first and second query execution plans of said plurality of query execution plans that have a maximum distance between a first measurement set associated with said first query execution plan and a second measurement set associated with said second query execution plan, wherein said first and second measurement sets are included in said plurality of measurement sets, and wherein said plurality of optimal execution costs includes a first optimal execution cost of optimally executing said query via said first query execution plan with a first bind value set of said plurality of bind value sets, and further includes a second optimal execution cost of optimally executing said query via said second query execution plan with a second bind value set of said plurality of bind value sets;

determining, by said computing system, a first execution cost of executing said query via said first query execution plan with said second bind value set and a second execution cost of executing said query via said second query execution plan with said first bind value set;

said computing system determining a first difference between said first execution cost and said first optimal execution cost, and a second difference between said second execution cost and said second optimal execution cost;

determining at least one difference of said first and second differences exceeds a predefined threshold value;

based on said determining said at least one difference exceeds said predefined threshold value, said computing system automatically selecting a frequency of optimizing said query to be reoptimizing said query each time said query is executed instead of selecting optimizing said query only once;

based on said automatically selected frequency of optimizing said query, said computing system executing said query on a database for each bind value set of said plurality of bind value sets, wherein a result of said executing said query is a reduction of a total cost of ownership of said database.

9. The computing system of claim 8, wherein said method further comprises collecting parameter marker data by said computing system, said parameter marker data including said plurality of bind value sets, wherein said collecting said parameter marker data comprises:

extracting, from a record of a binary dump file provided by a database feedback warehouse system, query information and said first bind value set of said plurality of bind value sets, said query information including a text of said query, a timestamp indicating an execution of said query, and an amount of time taken by said execution of said query; and storing said query information and said first bind value set in a plurality of relational database tables.

10. The computing system of claim 9, wherein said first bind value set includes one or more actual values of said one or more parameters or one or more selectivities of one or more bind values of said first bind value set.

11. The computing system of claim 8, wherein said method further comprises collecting parameter marker data by said computing system, said parameter marker data including said plurality of bind value sets, wherein said collecting said parameter marker data comprises:
    parsing said query with a Structured Query Language (SQL) parser;
    identifying one or more database columns referred to by one or more predicates that include said one or more parameter markers;
    obtaining single-column database statistics associated with said one or more database columns;
    collecting said plurality of bind value sets from said single-column database statistics; and
    determining selectivities of said plurality of bind value sets from said single-column database statistics.

12. The computing system of claim 8, wherein said method further comprises collecting parameter marker data by said computing system, said parameter marker data including said plurality of bind value sets, wherein said collecting said parameter marker data comprises:
    parsing said query with a Structured Query Language (SQL) parser;
    identifying one or more database columns referred to by one or more predicates that include said one or more parameter markers; and
    selecting, via random sampling, said plurality of bind value sets from said one or more database columns.

13. The computing system of claim 8, wherein said method further comprises:
    obtaining a second plurality of bind value sets and a second plurality of measurement sets associated with said second bind value sets in a one-to-one correspondence, each bind value set of said second plurality of bind value sets including at least one bind value and associated with said one or more parameter markers of a second query, and each measurement set of said second plurality of measurement sets selected from the group consisting of one or more selectivity measurements and one or more cardinality measurements;
    generating a second plurality of query execution plans for an execution of said second query, each query execution plan of said second plurality of query execution plans capable of optimally executing said second query with one or more bind value sets of said second plurality of bind value sets;
    determining a set of optimal execution costs associated with said query execution plans of said second plurality of query execution plans in a one-to-one correspondence, each optimal execution cost of said set of optimal execution costs being a cost of optimally executing said second query with a bind value set of said second plurality of bind value sets;
    determining one or more pairs of bind value sets $(p1, \ldots, pn)_i$, $(q1, \ldots, qn)_i$ of said second plurality of bind value sets, said determining said one or more pairs of bind value sets including determining one or more distances $d_i$ between a first measurement set $S1_i$ associated with said bind value set $(p1, \ldots, pn)_i$ and a second measurement set $S2_i$ associated with said $(q1, \ldots, qn)_i$, said $S1_i$ and said $S2_i$ included in said second plurality of measurement sets, wherein each distance $d_i$ is a maximum distance between any pair of measurement sets associated with query execution plans $P_i$ and $Q_i$ of said second plurality of query execution plans, wherein said query execution plan $P_i$ optimally executes said second query with said bind value set $(p1, \ldots, pn)_i$ and said query execution plan $Q_i$ optimally executes said second query with said bind value set $(q1, \ldots, qn)_i$, and wherein said $i \geq 1$;
    determining one or more pairs of execution costs $C1_i$, $C2_i$, wherein said $C1_i$ is a cost of executing said second query via said query execution plan $P_i$ with bind value set $(q1, \ldots, qn)_i$ and said $C2_i$ is a cost of executing said second query via said query execution plan $Q_i$ with bind value set $(p1, \ldots, pn)_i$, wherein said determining said one or more pairs of execution costs $C1_i$, $C2_i$ includes:
        using a database hint to force said second query to use said query execution plan $P_i$ with bind value set $(q1, \ldots, qn)_i$, and
        using said database hint to force said second query to use said query execution plan $Q_i$ with bind value set $(p1, \ldots, pn)_i$;
    determining one or more pairs of differences $D1_i$ and $D2_i$, wherein said $D1_i$ is a difference between said cost $C1_i$ and an optimal execution cost $OC1_i$ of said set of optimal execution costs and said $D2_i$ is a difference between said cost $C2_i$ and an optimal execution cost $OC2_i$ of said set of optimal execution costs, wherein said $OC1_i$ is a cost of optimally executing said second query via said query execution plan $Q_i$ with bind value set $(q1, \ldots, qn)_i$, and said $OC2_i$ is a cost of optimally executing said second query via said query execution plan $P_i$ with bind value set $(p1, \ldots, pn)_i$;
    determining each difference of said one or more pairs of differences $D1_i$ and $D2_i$ does not exceed said predefined threshold value;
    based on said determining each difference of said one or more pairs of differences does not exceed said predefined threshold value, automatically selecting a second frequency of optimizing said second query to be optimizing said second query only once instead of reoptimizing said second query each time said second query is executed; and
    based on said automatically selected second frequency of optimizing said second query, executing said second query on said database for each bind value set of said second plurality of bind value sets, wherein a result of executing said second query is said reduction of said total cost of said database.

14. A computer-implemented method of determining an optimization frequency of a query having one or more parameter markers, said method comprising:
    obtaining, by a computing system, a plurality of bind value sets, each bind value set including one or more bind values and associated with one or more parameter markers of a query;
    obtaining, by said computing system, a plurality of measurement sets associated with said bind value sets in a one-to-one correspondence, each measurement set selected from the group consisting of one or more selectivity measurements and one or more cardinality measurements;
    determining, by said computing system, a plurality of query execution plans, each query execution plan capable of optimally executing said query with one or more bind value sets of said plurality of bind value sets;
    determining, by said computing system, a first set of execution costs associated with said query execution plans of said plurality of query execution plans in a one-to-one correspondence, each execution cost of said first set being a cost of optimally executing said query with a bind value set of said plurality of bind value sets;

determining, by said computing system, one or more pairs of bind value sets $(p1, \ldots, pn)_i$, $(q1, \ldots, qn)_i$ of said plurality of bind value sets, said determining said one or more pairs of bind value sets including determining one or more distances $d_i$ between a first measurement set $S1_i$ associated with said bind value set $(p1, \ldots, pn)_i$ and a second measurement set $S2_i$ associated with said $(q1, \ldots, qn)_i$, said $S1_i$ and said $S2_i$ included in said plurality of measurement sets, wherein each distance $d_i$ is a maximum distance between any pair of measurement sets associated with query execution plans $P_i$ and $Q_i$ of said plurality of query execution plans, wherein said query execution plan $P_i$ is an optimal query execution plan associated with said bind value set $(p1, \ldots, pn)_i$ and said query execution plan $Q_i$ is an optimal query execution plan associated with said bind value set $(q1, \ldots, qn)_i$, and wherein said $i \geq 1$;

determining, by said computing system, one or more pairs of execution costs $C1_i$, $C2_i$ of a second set of execution costs, wherein said $C1_i$ is a cost of executing said query via said query execution plan $P_i$ with bind value set $(q1, \ldots, qn)_i$ and said $C2_i$ is a cost of executing said query via said query execution plan $Q_i$ with bind value set $(p1, \ldots, pn)_i$, wherein said determining said one or more pairs of execution costs $C1_i$, $C2_i$ of said second set of execution costs includes:

using a database hint to force said query to use said query execution plan $P_i$ with bind value set $(q1, \ldots, qn)_i$, and using said database hint to force said query to use said query execution plan $Q_i$ with bind value set $(p1, \ldots, pn)_i$;

determining, by said computing system, one or more pairs of differences $D1_i$ and $D2_i$, wherein said $D1_i$ is a difference between said cost $C1_i$ and an optimal execution cost $OC1_i$ of said first set of execution costs and said $D2_i$ is a difference between said cost $C2_i$ and an optimal execution cost $OC2_i$ of said first set of execution costs, wherein said $OC1_i$ is a cost of optimally executing said query via said query execution plan $Q_i$ with bind value set $(q1, \ldots, qn)_i$, and said $OC2_i$ is a cost of optimally executing said query via said query execution plan $P_i$ with bind value set $(p1, \ldots, pn)_i$;

automatically selecting, by said computing system, an optimization frequency, wherein said optimization frequency is selected from the group consisting of optimizing said query once and reoptimizing said query each time said query is executed; and executing, according to said automatically selected optimization frequency, said query on a database for each bind value set of said plurality of bind value sets, wherein a result of said executing said query is a reduction of a total cost of ownership of said database, wherein said optimization frequency is said optimizing said query once as a result of a first determination, via said determining said one or more pairs of differences, that none of the differences of said one or more pairs of differences $D1_i$ and $D2_i$ exceeds a predefined threshold value, and wherein said optimization frequency is said reoptimizing said query each time said query is executed as a result of a second determination, via said determining said one or more pairs of differences, that at least one difference of said one or more pairs of differences exceeds said predefined threshold value.

15. The method of claim 14, wherein each measurement set of said plurality of measurement sets is one or more selectivity measurements.

16. The method of claim 14, wherein each measurement set of said plurality of measurement sets is one or more cardinality measurements.

17. A computer program product, comprising a computer-readable, tangible storage device having a computer-readable program code stored therein, said computer-readable program code containing instructions that are carried out by a processor of a computer system to implement the method of claim 14.

\* \* \* \* \*